United States Patent
Birka et al.

(10) Patent No.: US 12,038,873 B2
(45) Date of Patent: Jul. 16, 2024

(54) DATABASE MANAGEMENT SYSTEM

(71) Applicant: Singlestore, Inc., San Francisco, CA (US)

(72) Inventors: Adrian Birka, Seattle, WA (US); Rodrigo Toste Gomes, San Francisco, CA (US)

(73) Assignee: Singlestore, Inc., San Francisco, CA (US)

( * ) Notice: Subject to any disclaimer, the term of this patent is extended or adjusted under 35 U.S.C. 154(b) by 0 days.

(21) Appl. No.: 17/903,863

(22) Filed: Sep. 6, 2022

(65) Prior Publication Data

US 2023/0008732 A1 Jan. 12, 2023

Related U.S. Application Data

(63) Continuation of application No. 16/382,017, filed on Apr. 11, 2019, now Pat. No. 11,468,011.

(51) Int. Cl.
*G06F 16/17* (2019.01)
*G06F 16/23* (2019.01)

(52) U.S. Cl.
CPC ...... *G06F 16/1734* (2019.01); *G06F 16/1727* (2019.01); *G06F 16/2358* (2019.01)

(58) Field of Classification Search
CPC ............. G06F 16/1734; G06F 16/1727; G06F 16/2358
See application file for complete search history.

(56) References Cited

U.S. PATENT DOCUMENTS 10,628,270 B1 * 4/2020 Bajaj ................. G06F 11/1471
10,831,706 B2 11/2020 Hoobler et al.
(Continued)

FOREIGN PATENT DOCUMENTS

WO 2011100365 A1 8/2011

OTHER PUBLICATIONS

Brad Calder et al: "Windows Azure Storage" Operating Systems Principles, Oct. 23, 2011, pp. 143-157, XP058005751.
(Continued)

*Primary Examiner* — Dangelino N Gortayo
(74) *Attorney, Agent, or Firm* — EIP US LLP

(57) ABSTRACT

A method for managing log files for recording operations on data stored in a database is provided, wherein a set of log files having an allocated first portion of storage is updated, the allocated first portion of storage is monitored, and a second portion of storage is allocated in dependence on a determination that an available portion of storage is below a predetermined size. A method for generating a snapshot is provided, wherein data entries are included in the snapshot in dependence on a determined relative order of log records in a set of log files. A method of replicating a binary large object is provided, wherein the binary large object is sent to a second database in response to identifying a log record comprising data indicating the binary large object. A method for deleting one or more binary large objects is provided, wherein the data indicating one or more binary large objects that have been logically deleted are stored in a snapshot and the one or more binary large objects are deleted using the data indicating the one or more binary large objects after a previous snapshot is deleted.

15 Claims, 19 Drawing Sheets

(56) References Cited

U.S. PATENT DOCUMENTS

| | | | |
|---|---|---|---|
| 2005/0071389 A1 | 3/2005 | Gupta | |
| 2012/0030172 A1* | 2/2012 | Pareek | G06F 16/275 |
| | | | 707/635 |
| 2012/0059798 A1* | 3/2012 | Madhavarapu | G06F 16/178 |
| | | | 707/655 |
| 2015/0331793 A1 | 11/2015 | Matsuzawa | |
| 2016/0110403 A1 | 4/2016 | Lomet et al. | |
| 2016/0283503 A1 | 9/2016 | Parikh et al. | |
| 2017/0123955 A1 | 5/2017 | Hayashi | |
| 2017/0277709 A1 | 9/2017 | Strauss et al. | |
| 2018/0025043 A1 | 1/2018 | Novakovic et al. | |
| 2018/0067662 A1 | 3/2018 | Leshinsky et al. | |
| 2018/0217910 A1 | 8/2018 | Yang et al. | |
| 2018/0260428 A1* | 9/2018 | Patel | G06F 11/2094 |
| 2019/0065542 A1 | 2/2019 | Baker et al. | |
| 2019/0129956 A1 | 5/2019 | Choi | |
| 2019/0163647 A1 | 5/2019 | Volvovski et al. | |
| 2019/0340185 A1* | 11/2019 | Seela | G06F 16/273 |
| 2020/0192899 A1 | 6/2020 | Joshi et al. | |

OTHER PUBLICATIONS

Chen, Raymond: "How can I preallocate disk space for a file without it being reported as readable?", Blog Post, Jul. 14, 2016, https://devblogs.microsoft.com/oldnewthing/?p=93875.

Assaf, William: "Pre-Grow Your SQL Server Database Data and Log Files", Blog post, Apr. 14, 2014, http://www.sparkhound.com/blog/pre-grow-your-sql-server-database-data-and-log-files.

Nightingale et al.: "Flat Datacenter Storage", Microsoft Research, University of Texas at Austin, 10th USENIX Symposium on Operating Systems Design and Implementation (OSDI '12).

\* cited by examiner

DATABASE MANAGEMENT SYSTEM

CROSS-REFERENCE TO RELATED APPLICATIONS

This application is a continuation of U.S. application Ser. No. 16/382,017, filed Apr. 11, 2019. The above-referenced patent application is incorporated by reference in its entirety.

BACKGROUND OF THE INVENTION

Field of the Invention

The present application relates to database management systems, and more specifically, methods and systems for increasing the efficiency of relational database management systems.

Description of the Related Technology

As technologies advance, the amount of information stored in electronic form and the desire for real-time, or pseudo real-time, ability to search, organize, and/or manipulate such information is ever increasing. Database management systems, sometimes also referred to as databases and data warehouses, are designed to organize data in a form that facilitates efficient search, retrieval, and/or manipulation of select information. Typical database management systems allow a user to submit a "query" or call one or more functions in a query language for searching, organizing, retrieving, and/or manipulating information that satisfies particular conditions.

Certain databases may be transactional in nature and may record transactions, comprising one or more operations performed to data, in logs. A log may be thought of as a continuous stream of log records each log record corresponding to a transaction. This may allow transactions to be replayed or undone following a crash. Logs may also be used to replicate databases by sending logs between databases and performing the transactions recorded therein to replicate a database. Log records may be stored in log files which are periodically updated and truncated. When performing a transaction, the log files may be grown as log records are generated. When a log file becomes full a second log file may be generated. While generating the second log file, transactions may not be completed, as their corresponding log records cannot be generated until they can be recorded in the second log file. In some database systems, snapshots may be used to restore or replicate databases by initializing a state of the database from a snapshot and replaying only and all transactions that were performed at a time after the snapshot was generated. Binary large objects may be large files in binary format which are difficult to manage in conventional databases as they are not structured like other data types typically managed by databases.

Demands on database systems may vary and to handle increased demand, database systems may be scalable. Scale-up database systems handle the increased demands of users of the database system by increasing the resources of an existing server by increasing the memory or upgrading the CPUs. Scale-out database systems increase the capacity by adding new nodes, that is to say new machines, to the database system. Using scale-out to expand a database system may increase both the storage capacity of the database system as well increasing the traffic capacity.

It would be advantageous to reduce time spent growing log files when performing transactions. It would be advantageous to efficiently generate snapshots from which a database can be efficiently restored or replicated. It would also be advantageous to more effectively handle binary large objects.

SUMMARY

According to a first aspect of the present disclosure there is provided computer-implemented method for managing log files for recording operations on data stored in a database, the operations comprising reading or writing data to the database, the method comprising: updating a set of log files by writing data indicative of one or more operations that have been performed to data stored in a database to the set of log files, the set of log files having an allocated first portion of storage; monitoring the first portion of storage while the set of log files are being updated; and dependent on a determination that an available portion of the first portion of storage is below a predetermined size, allocating a second portion of storage for the set of log files while the set of log files are being updated.

Monitoring an available portion of the first portion of storage and allocating a second portion of storage while the set of log files are being updated prevents a database system from blocking transactions from being performed while generating further log files. Transactions cannot be performed and/or completed until they are recorded in a log record and so allocating the resources to record further log records while the first portion of storage is being updated prevents transactions from being blocked once the first portion of storage becomes full.

According to a second aspect of the present disclosure there is provided a computer-implemented method for generating a snapshot representing a state of a database at a given time, the method comprising: generating a data entry in a database, the data entry being associated with a log record for recording at least one operation corresponding to the data entry, the log record corresponding to a log sequence indicator; selecting a snapshot cutoff log sequence indicator; determining a relative order of the log sequence indicator and the snapshot cutoff log sequence indicator; and generating a snapshot representing a state of the database at a time corresponding to the snapshot cutoff log sequence indicator, wherein the snapshot comprises the data entry in dependence on the determined relative order.

This allows, when recovering or re-initializing the database using a snapshot, a database system to replay any transactions corresponding to log records which are in the set of log files after the selected snapshot cutoff log sequence indicator. Further, including entries in a snapshot based on the position of their corresponding log records prevents the database system from having to individually determine which log records are to be replayed. Consequently, the log records do not need to be associated with a time at which their corresponding data entries are generated in the database until the data entry is fully generated. This prevents dirty reads wherein a data entry is made visible to an end user or application before it has been fully generated. Providing an efficient way of generating snapshots such that log records can be easily replayed may be of particular benefit in distributed relational database systems wherein databases are replicated between partitions in a node, or between nodes, for durability. Being able to generate snapshots from which a database can be more efficiently recovered or replicated may be of particular value to scale-out architecture database systems in which replication of databases occurs frequently.

According to a third aspect of the present disclosure there is provided a computer-implemented method for replicating a binary large object stored at a first database to a second database, the method comprising: sending a set of log records corresponding to operations performed to data stored at the first database to the second database; identifying a log record of the set of log records comprising an indication of a binary large object stored at the first database; and in response to identifying the log record comprising an indication of the binary large object stored at the first database, sending the binary large object stored at the first database to the second database.

Having a single process which sends binary large objects after their corresponding log records have been identified allows transactions to be committed quicker and prevents transactions corresponding to replicating binary large objects at the second database from being uncommitted for a long period of time, thereby reducing the number of open transactions and/or write operations running at any one time. Efficient replication provides increased durability and capacity in distributed database systems in which replication between databases occurs frequently during both the provisioning of new resources and during stable operation.

According to a fourth aspect of the present disclosure there is provided a computer-implemented method for physically deleting one or more binary large objects from a database, wherein the database has a plurality of states, a first said state of the database at a first time being represented by a first snapshot, the method comprising; generating a second snapshot representing a state of the database at a second time, the second time being later than the first time and the second snapshot comprising data identifying one or more binary large objects that have been logically deleted from the database before the second time; deleting the first snapshot; and subsequent to deleting the first snapshot, using the data identifying one or more binary large objects that have been logically deleted before the second time to physically delete the one or more binary large objects from the database.

Storing data identifying one or more binary large objects that have been logically deleted before the second time in the second snapshot allows the binary large objects to be quickly and efficiently located once it is appropriate to physically delete the binary large objects by accessing the data stored in the second snapshot. Binary large objects which have been logically deleted can be physically deleted if the transaction corresponding to the logical deletion of the binary large object occurred before a time corresponding to an oldest snapshot. When a snapshot is deleted a set of binary large objects, which were logically deleted after the snapshot was generated and before the next sequential snapshot was generated can be physically deleted. These binary large objects are located by looking at the data stored in the next sequential snapshot. Storing this data in the snapshot also allows the data to be deleted periodically when it is no longer needed. Deleting binary large objects when it is logically correct to do so frees up resources in a database system more quickly so that they can be redistributed to deal with demand on the database system.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION OF CERTAIN EMBODIMENTS

Figure 1:
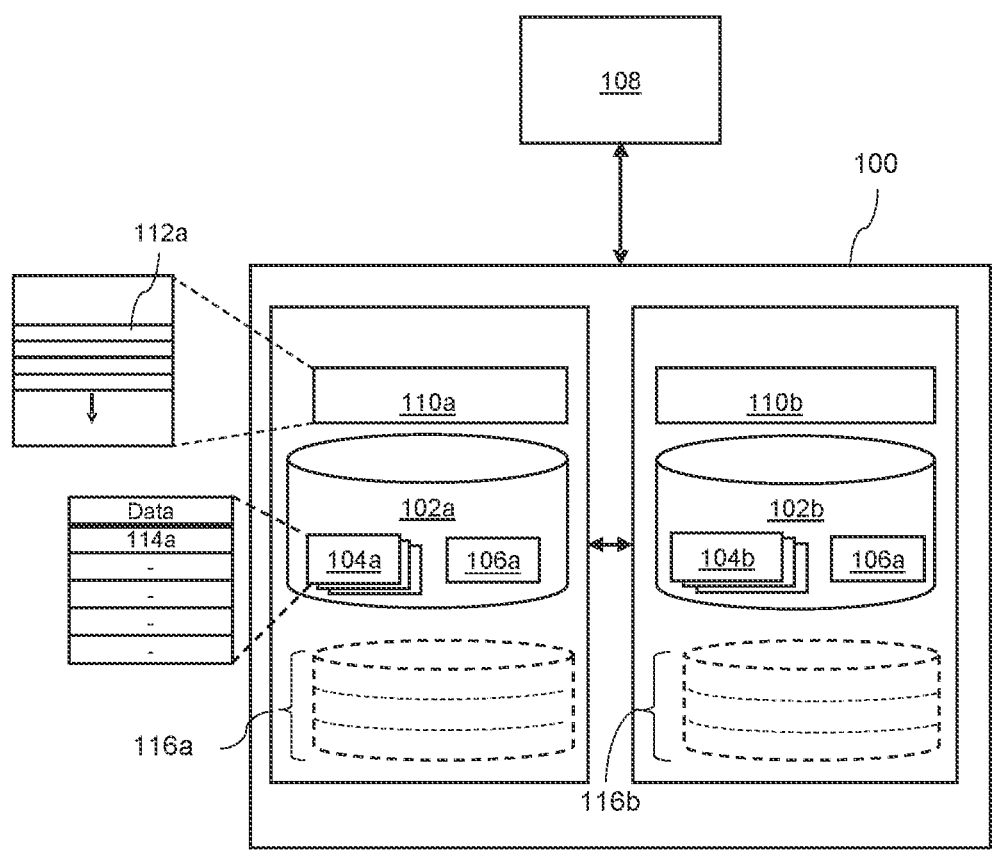
FIG. 1 shows a schematic diagram of a database system, according to an example.

FIG. 1 shows schematically a database system 100 to which embodiments described herein may relate. The database system 100 comprises at least one database 102a and other data used to manage the database 104a. FIG. 1 shows two databases 102a and 102b, although it will be appreciated that a database system may comprise any number of databases. In some examples, the databases are virtual databases stored on one machine. In other examples the databases are stored on separate machines wherein the database system 100 is implemented in a networked computer. A database may generally be considered as an organized collection of data stored electronically in a computer system. The databases 102a, 102b comprise a collection of data comprising structured data 104a, 104b, for example data sorted into tables in either a row store format, a columnar store format, or a combination of the two. The databases 102a, 102b also comprise unstructured data 106a, 106b. The unstructured data 106a, 106b comprises, one or more binary large objects. A binary large object may be stored at a database and a pointer to the binary large object may be stored in the structed data 104a, 104b such that the binary large object 106a, 106b can be easily accessed. The database 102a, 102b may comprise data stored according to a relational model. Data stored in a database according to a relational model may be accessible using any suitable query language. In an example, Structured Query Language (SQL) can be used to operate on data stored at a database 102a, 102b.

The database system 100 comprises a database management system. A database management system may be software and/or hardware configured to handle interactions from applications or end users 110 with the one or more databases 102a, 102b. A database management system also provides other functions to maintain one or more databases 102a, 102b. Database management systems may be used to maintain the crash stability of one or more databases 102a, 102b by backing up data stored on the one or more databases and information relating to the structure of the data stored therein. The database management system may reinitialize or restore the database following a crash. A database management system may be used to manage a plurality of nodes. Each node may comprise one or more partitions, each partition representing a version of a database. One or more of the partitions may be slaves, configured to replicate a master. The database management system may comprise the databases 102a, 102b, or may be used to control the databases 102a, 102b where the databases 102a, 102b are external from the database management system. The total of the database management system and any number of databases together may be referred to as a database system 100. When operating on a database 102a, 102b, a database management system accesses an instance of the database by opening or mounting a database to manipulate the data within the database. A database management system may provide various functions including providing facilities for an end user 108 or applications to read, write, and modify data stored in one or more databases 102a, 102b. The database management system receives queries from an end user 108 or application accessing the database 102a,102b and performs transactions on data stored in the database 102a, 102b according to the queries. A transaction is a unit of work performed within a database system on data stored therein. Transactions may be a single unit of logic or work performed to data stored in the database and comprise one or more operations on data. To maintain reliability and consistency in a database, transactions are atomic, consistent, isolated, and durable. These properties may be generally referred to as the ACID properties.

The database system 100 maintains a log of operations performed to data stored in the one or more databases 102a, 102b. A log may also be referred to as a transaction log, a database log, a binary log, or an audit trail. Each database is associated with at least one log. The log is used to record a history of transactions executed by a database management system on data stored at the database 102a, 102b. Database systems may maintain different logs for different types of transactions performed within the database system. Transactions are recorded in a log as log records. A log record is an entry in a log comprising an indicator of a relative position in the log and information relating to the transaction to which the log record relates. A log record 112a may comprise or be associated with a log sequence indicator, wherein each sequential log record which is generated is assigned a log sequence indicator above the previous most recent log sequence indicator. A log record 112a may include a term indicator wherein a term defines a portion of the log defined between a previous failover or crash of the database and a next subsequent failover or crash. When a failover or a crash occurs in a database a special start-of-term log record is generated denoting the start of a new term. When an instance of database 102a is opened such that the database management system is performing operations on data stored in the database 102a the database management system may be writing data to a log for recording the operations that have performed to the data. The log may be written to a set of log files for recording the transactions that have been executed by the database management system. Each database 102a, 102b may be associated with a respective set of log files 110a, 110b. The database 102a may comprise the set of log files 110a or the set of log files 110a may be stored remotely from the database 102a and an association between the database 102a and the set of log files 110a may be maintained. A log may be a write-ahead log in which transactions are recorded before the changes to the data stored in the database 102a are made permanent. Changes to data stored in the database 102a are made permanent by writing the data corresponding to the transactions to storage. The storage may be on disk or may be in other forms of memory.

FIG. 1 shows a database 102a, associated with a set of log files 110a. The log files 110a comprises one or more log records 112a. As discussed above a log record 112a comprises, or is associated with, an indicator of a relative position in the set of log files 110a and comprises information relating to the transaction to which the log record relates. The indicator of a relative position in the log file 110a may be a log sequence indicator, or a log sequence number. This may be stored in any suitable data format, such as an integer, a string, etc. The information relating to the transaction to which the log record 112a relates may be data indicating the one or more operations relating to the transaction such as an indication of the type of operation performed. Alternatively, the log record 112a may comprise an indication of the state of data stored in the database before and after the transaction. The log record 112a may comprise an indicator of a transaction, such as a transaction ID. A transaction ID may be related to a data entry 114a stored in the database 102a which was generated as part of, or according to, a transaction. The log record 112a may comprise an indication of a most recent previous log record in the log file 112a, where the log file 110a may be a linked list of log records 112a.

The database system 100 comprises a plurality of snapshots 116a, 116b corresponding to respective databases 102a, 102b. A snapshot represents a state of a database at a given time. For example, a snapshot may be a read-only copy of the data 104a, 106a stored in the database 102a at a given time. Snapshots in combination with other information such as log files can be used to recover a state of a database following a crash.

Log File Allocation

As discussed above, the database system 100 maintains a set of log files 110a for recording operations on data stored in the database 102a. The database system 100 prevents a transaction from being committed until a log record 112a corresponding to the transaction has been generated by writing data to the set of log files 110a. A transaction is said to be committed if one or more operations corresponding to the transaction to data stored in the database 102a have been made permanent. A last step in a transaction may involve committing the transaction wherein the transaction cannot be committed until the transaction has been recorded in a log record 112a. Maintaining a log record 112a corresponding to each transaction enables the database to be recovered or rolled back to a stable state following a crash. After a crash the database 102a can be restored to a state wherein either the transaction has been performed or has not been performed, but not in a state where a transaction has partially been performed.

Figure 2:
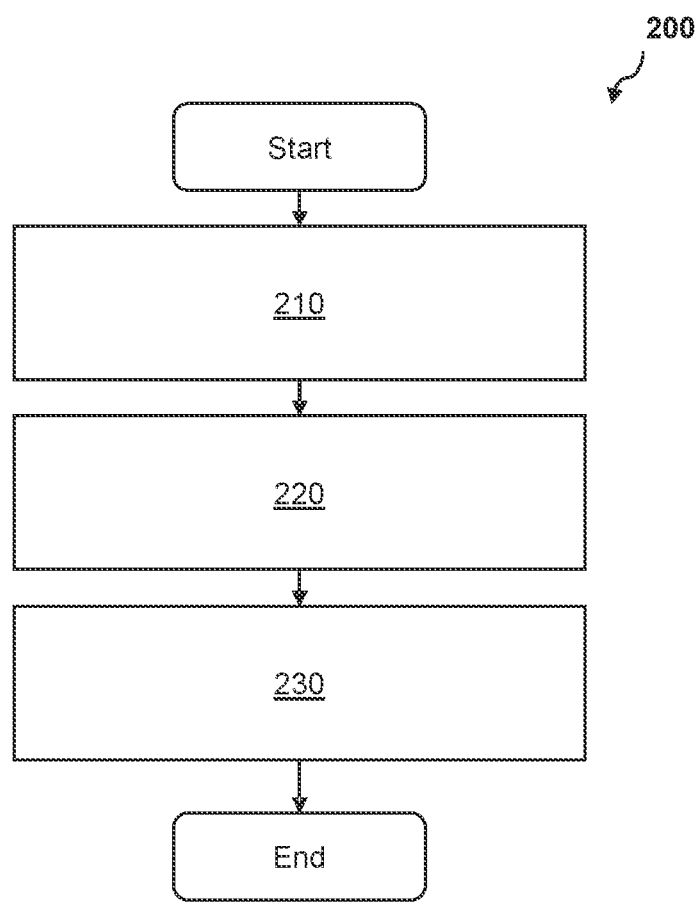
FIG. 2 shows a flow chart of a method of managing log files according to an example.

FIG. 2 shows a flow chart of a method 200 for managing log files for recording operations on data stored in a database 102a, the operations comprising reading or writing data to the database 102a. The method starts at block 210 where the method 200 comprises updating a set of log files 110a by writing data indicative of one or more operations that have been performed to data stored in a database 102a to the set of log files 110a, the set of log files 110a having an allocated first portion of storage. Writing data indicative of one or more operations that have been performed to data stored in a database 102a to the set of log files 110a may involve generating one or more log records 112a in the set of log files 110a. As discussed above a log record 112a may relate to a transaction comprising one or more operations on data stored at the database. Log records 112a may have a fixed size and/or a predetermined structure and are recorded in one or more pages, which may also be referred to as memory pages, storage pages, or virtual pages. A page being a contiguous block of virtual memory having a fixed length. Pages may have a minimum size of 4 KiB or 4 kB. Data may be stored in the database 102a in pages wherein a page map or a page table is used to identify the physical location where data is stored. Having a set of log files 110a with an allocated first portion of storage allows a database management system to write data indicative of one or more operations that have been performed to data stored in the database 102a to a set of log files 110a without having to physically grow the set of log files 110a before each write operation. When operating in a mode where transactions must be recorded in a respective log record 112a before being committed, having to grow the set of log files 110a before recording a transaction delays the transaction from being completed in the database system. In examples where the allocated first portion of storage is greater than the size of each portion of data indicative of one or more operations being written to the log file, the set of log files may record multiple transactions without having to grow the set of log files.

Writing data indicative of one or more operations that have been performed to data stored in the database 102a involves, after receiving a request to perform the one or more operations and performing the one or more operations in an isolated manner, reserving a part of the set of log files 110a. The part of the set of log files 110a being suitable for recording the one or more operations. Data indicative of the one or more operations is then recorded in the reserved part in the set of log files 110a. The one or more operations may not be committed until they are recorded in the set of log files 110a. Upon being committed, the result of the one or more operations becomes visible in the database, that is to say the results are able to be queried and are visible to subsequent transactions.

At block 220 the method comprises monitoring the first portion of storage while the set of log files 110a are being updated. Monitoring the first portion of storage may be performed by a dedicated thread configured to periodically access the set of log files. Alternatively, when writing data to the set of log files one or more variables are updated and monitoring the set of log files comprises accessing the one or more variables. Other suitable methods for monitoring the first portion of storage can also be used. At block 230 the method 200 involves, dependent on a determination that an available portion of the first portion of storage is below a predetermined size, allocating a second portion of storage for the set of log files 110a while the set of log files 110a are being updated. As discussed above, a transaction comprising one or more operations, cannot be committed, i.e. completed, until it has been logged in the set of log files 110a. Allocating a second portion of storage to the set of log files 110a while the set of log files 110a are being updated allows the database system to continue to process transactions in the database 102a without having to put a temporary block on active or incoming transactions while the database system is growing the set of log files 102a. As the second portion of storage is allocated while the first portion of storage has available space, once the first portion of storage becomes full, log records corresponding to current and incoming transactions will be recorded in the allocated second portion of storage. Therefore, by allocating the first portion of storage and allocating a second portion of storage while the set of log files 110a are being updated, operations performed to data stored in the database 102a can continue to be logged without needing to grow the set of log files 110a while recording each transaction. Allocating a second portion of storage may involve generating further log files having one or more pages. Pages of the newly generated log files are treated as invalid until data indicative of one or more operations is written to the newly generated log files. Further log files may be allocated an order in which they will be updated. For example, by association with a respective log file identifier indicating an order in which the log files will be updated.

Monitoring the first portion of storage while the set of log files 110a are being updated may involve periodically determining a size of the available portion of the first portion of storage. A thread running on the database management system may be configured to periodically access the set of log files 110a and determine the size of an available portion of the first portion of storage. Monitoring the first portion of storage while the set of log files 110a are being updated may be triggered in response to receiving a request to perform one or more operations on data stored in the database 102a. An operation on data stored in the database may include generating new data and/or reading, writing, or modifying previously stored data in the database 102a. Determining the size of the available portion of the first portion of storage in response to receiving the request to perform an operation on data stored at the database may be performed after a predetermined number of requests have been received or after every received request.

The predetermined size may be dependent on a rate of operations being performed to data stored in the database 102a. During periods of high activity wherein the available portion of the first portion of storage is decreasing faster, the predetermined size is greater such that the second portion of storage is allocated sooner. Allocating the second portion of storage takes time, therefore beginning allocating the second portion of storage sooner during periods of high activity prevents the first portion of storage from becoming full before the second portion of storage has been allocated. During periods of low activity, the second portion of storage is not allocated until closer to the time it is needed rather than being allocated well in advance of the first portion of storage becoming full. This prevents the second portion of storage from being allocated but left unused for a long period. The predetermined size may be dependent on the size of the allocated first portion of storage. The predetermined size may be a proportion of the size of the first portion of storage, for example less than 20%. The predetermined size may be determined by an operator of the database system 100, such as an admin of the database system 100.

The predetermined size may be dependent on a ratio between the size of the first portion of storage and the size of the data indicative of one or more operations that have been performed to data stored in the database 102a. For example, where one or more log records 112a are written to the set of log files 110a, the predetermined size may relate to a ratio between an estimated number of further log records which can be written to the set of log files 110a and the number of log records currently written to the set of log files 110a. The estimated number of further log records which can be written to the set of log files being dependent on the available portion of the allocated first portion of storage.

The size of the second portion of storage may be dependent on the rate of operations being performed to data stored in the database 102a. The database system 100 may monitor the rate at which the set of log files 110a are being updated and the size of the second portion of storage may be dependent on this rate. In this way, during periods of high activity, the second portion of storage which is allocated may be large so as to handle the increased activity. This prevents the system from having to allocate further portions of storage shortly after allocating the second portion of storage. Alternatively, or additionally, the size of the second portion of storage may be determined in response to a request to perform one or more operations on data stored in the database 102a. A request to perform one or more operations on data stored in the database 102a may comprise an indicator that a plurality of operations on data to be stored in the data are to be performed. For example, an end user 108 of the database 102a, 102b may periodically instruct the database system to perform a plurality of operations on data stored in the database 102a. A first request to perform the one or more operations on data stored in the database may include an indication that a plurality of requests to perform operations on data stored in the database are to be received. As a result, the size of second portion of storage is determined in anticipation of a plurality of requests to perform operations on data stored in the database 102a, to be received.

Figure 3:
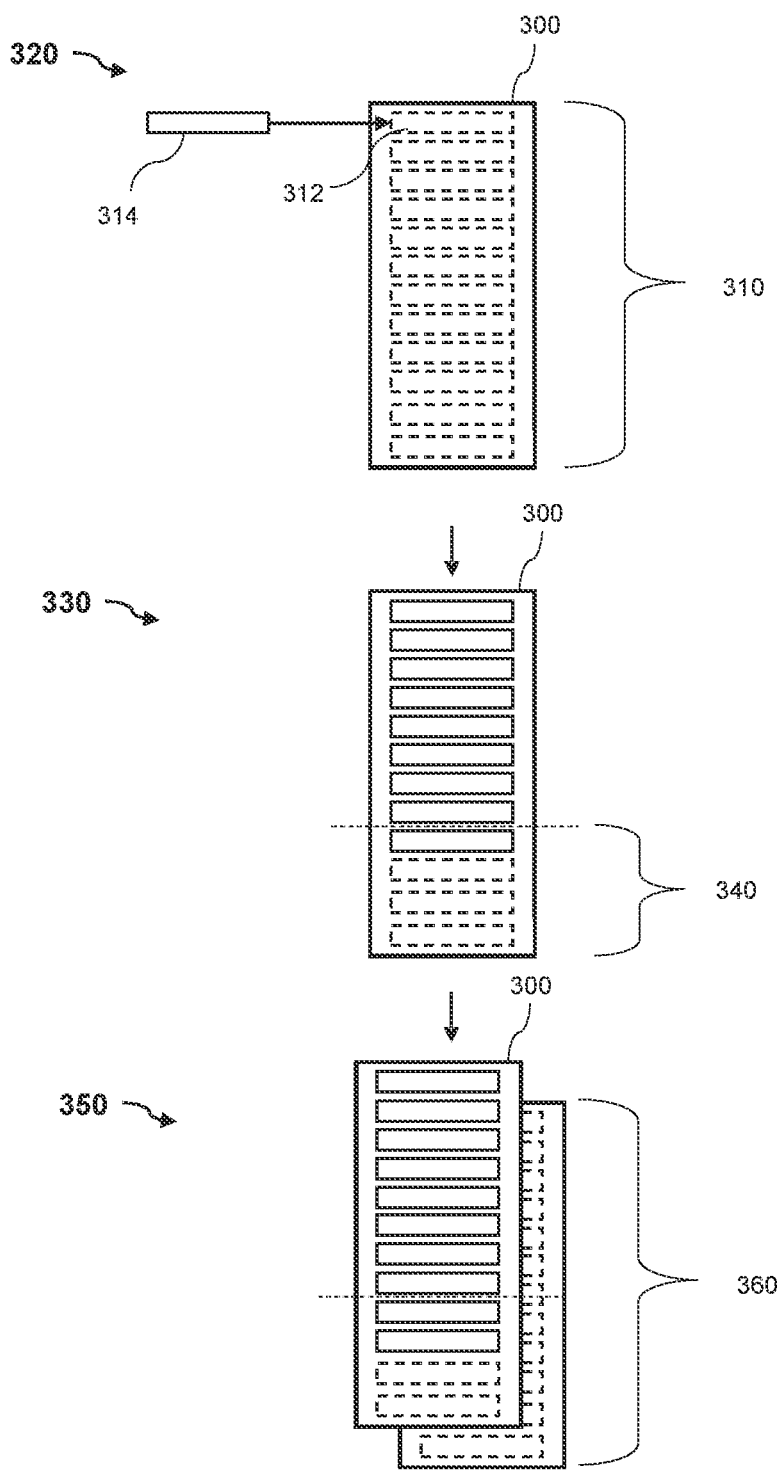
FIG. 3 shows schematically a set of log files being managed according to an example.

FIG. 3 shows schematically a set of log files 300 having an allocated first portion of storage 310. In FIG. 3, the set of log files 300, comprise one log file. However, it will be appreciated that a set of log files can include a plurality of log files. The allocated first portion of storage may comprise a plurality of pages having a predetermined size. FIG. 3 shows at 320, the set of log files 300 at a first time. At the first time, data indicative of one or more operations performed to data stored in the database has not yet been written to the set of log files 300. The set of log files 300, at the first time, includes a plurality of pages for storing data, the pages being invalid until data indicative of one or more operations is written to them, invalid pages may also be referred to as torn pages. A transaction relating to one or more operations performed to data stored in the database 102a can be recorded on more than one page, for example, where data indicative of the transaction to be written to the set of log files 300 is greater than the size of the pages in the set of log files 300. A page is treated as invalid if it is associated with, or comprises, an indication that the page is invalid. The plurality of pages in the set of log files 300 before data is written to them are shown in broken lines at 320. Updating the set of log files 310 involves writing data indicative of one or more operations that have been performed to data stored in the database to the set of log files 300, this is shown in FIG. 3 where data 314 is being written to a first page 312 in the set of log files 300.

FIG. 3 shows at 330, the set of log files 300 at a second time, the second time being later than the first time, and the set of log files 300 that have been updated by writing data indicative of one or more operations performed to data stored in the database. The available portion of the first portion of storage may be defined by an amount of storage in the first portion of storage occupied by invalid pages, shown in broken lines. At the second time, the available portion has fallen below a predetermined size 340 and so a second portion of storage is to be allocated to the set of log files 300. FIG. 3 shows at 350, the set of log files 300 at a third time, the third time being later than the second time and wherein following the determination that the available portion of storage has fallen below the predetermined size 340, a second portion of storage 360 has been allocated to the set of log files 300.

In situations where the databases crashes, the database system tries to locate the most recent data indicative of one or more operations performed to data stored in the database 102a which has been written to the set of log files 300, to restore the database 102a to a known state. A database may crash due to a power failure of one or more machines hosting the database system, a hardware failure such as memory, disk, CPU, or network failure, or operating system errors, or other software or hardware related issues. Where the set of log files 300 have an allocated portion of storage it is not possible to locate the most recent data written to the set of log files by accessing the end of the set of log files 300 as there will be invalid pages at the end of the set of log files 300 until data is written there. Accordingly, the method may involve updating a tracking file comprising an indicator of a portion of the set of log files 300 to indicate a most recently updated portion of the set of log files. Maintaining an indication of a most recently updated portion of the set of log files allows data indicative of a most recent operation that has been performed to data stored in the database to be located. For example, by accessing the indicated portion of the set of log files and iterating through the set of log records until a most recently generated log record is found.

Figure 4A:
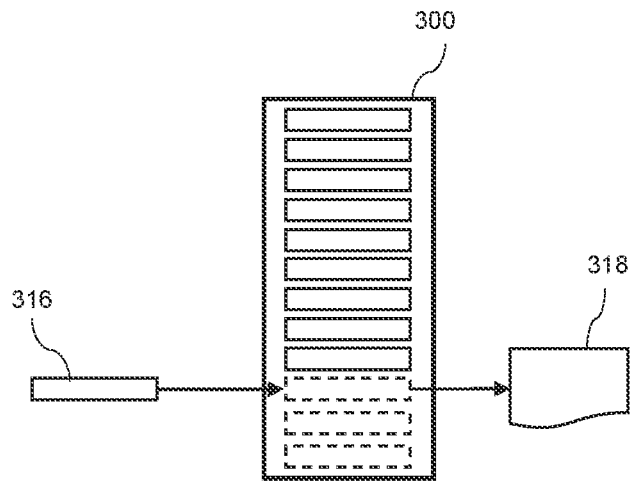
FIGS. 4A and 4B show schematically a tracking file being updated according to an example.

FIG. 4A shows schematically the set of log files 300 wherein data 316 indicative of one or more operations that have been performed to data stored in the database is being written to the set of log files 300 and a tracking file 318 is being updated. Updating the tracking file 318 includes updating an indicator such that it indicates a most recent portion of the set of log files 300 which have been updated. Updating the tracking file 318 may be performed periodically by using a thread, running on the database management system, which, after a predetermined interval of time, will update the tracking file 318.

In some examples, writing data indicative of one or more operations that have been performed to data stored in the database to the set of log files 300 involves generating one or more log records in the set of log files. Each log record corresponds to a log sequence indicator indicating a relative sequence in the set of log files 300. The indicator of a portion of the set of log files 300 may correspond to a log record in the set of log files. As a result, when determining the most recent log record that has been generated in the set of log files, the database system may begin iterating through the set of log files starting at the log record corresponding to the indicator in the tracking file 318. Updating the indicator of a portion of the set of log files may involve using a log sequence indicator corresponding to a most recently generated log record as at least part of the indicator of a portion of the set of log files 300. For example, the tracking file 318 may have a log sequence indicator of a log record that has been written to the set of log files 300. The indicator of a portion of the set of log files stored in the tracking file may also comprise an indication of a term of the most recently updated portion of the set of log files, wherein each log record may be associated with a term. A thread which is configured to periodically update the tracking file 318 may do so in response to a log record being generated.

In other examples, updating the indicator of a portion of the set of log files 300 may comprise selecting a log sequence indicator which is higher than the log sequence indicator corresponding to the most recently generated log record to be used as at least part of the indicator of a portion of the set of log files. To locate the most recent log record generated in the set of log files the system may iterate backwards through the set of log files 300 starting at the position in the set of log files indicated by the tracking file until the first valid page is found. Updating the tracking file periodically increases the efficiency of maintaining an indication of the most recently updated portion of the set of log files 300 as the database system does not need to write to the tracking file 318 after generating each log record. Generally, the term in the log changes less frequently than the tracking file is updated and so maintaining a term allows the database system to quickly locate a first portion of the set of log files and then search for the most recently updated portion of the set of log files within this first portion, based on the tracking file.

Figure 4B:
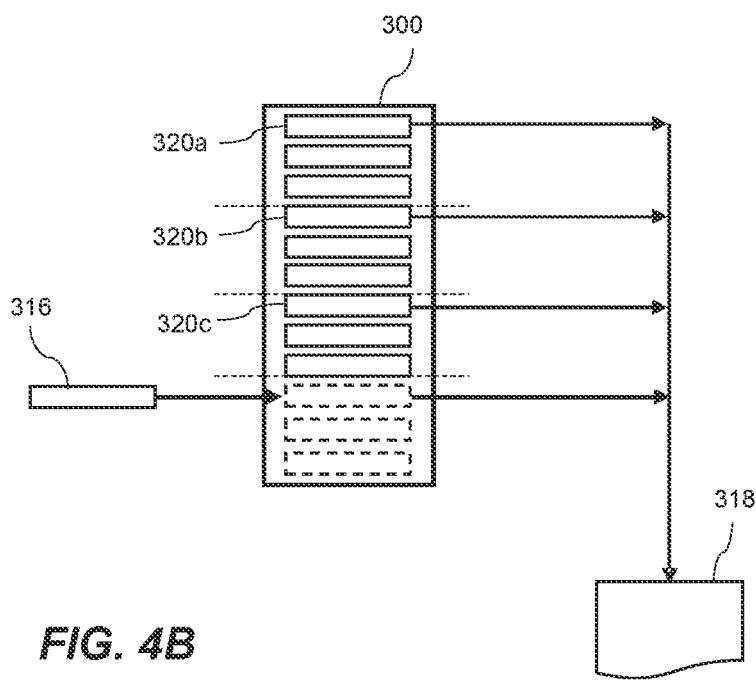

Updating the tracking file 318 may be performed in response to generating a log record. For example, the tracking file may be updated after a predetermined number of log records have been generated in the set of log files 300. The tracking file 318 may thereafter be continually updated following a further predetermined number of log records being generated in the set of log files 300. Where the tracking file 318 comprises a log sequence indicator of a most recently generated log record, updating the tracking file 318 may be performed once a log sequence indicator for a current log record being generated is selected. FIG. 4B shows schematically an example wherein the tracking file 318 is updated when particular log records 320a, 320b, 320c are generated in the set of log files 300. Alternatively, the indicator of a portion of the set of log files 300 may be updated in response to generating each log record. Updating the tracking file 318 in response to generating each log record allows the most recent data indicative of one or more operations performed to data stored in the database to be found following a crash without having to iterate through the set of log files.

Each page in the set of log files 300 may be associated with a log sequence indicator and where a log record is stored on more than one page, the log record may correspond to more than one log sequence indicator. Accordingly, updating the indicator of a portion of the set of log files may involve using a highest log sequence indicator corresponding to a most recently generated log record as at least part of the indicator of a portion of the set of log files. Each page may comprise a log sequence indicator corresponding to the log record and an indicator of an offset in the log record. In such cases, updating the tracking file involves updating the tracking file using the log sequence indicator after all the pages corresponding to the log record have been recorded in the set of log files.

In some modes of operation of the database system, a transaction cannot be committed until the tracking file 318 has been updated such that the indicator of the portion of the set of log files 300 in the tracking file 318 indicates a portion of the set of log files 300 at or following the portion of the set of log files 300 comprising the log record corresponding to the transaction. Accordingly, generating a log record may involve determining that a highest log sequence indicator associated with the log record has been used to update the tracking file 318, or the tracking file 318 comprises a log sequence indicator above the highest log sequence indicator associated with the log record. Alternatively, or additionally, a transaction may be committed if and only if a highest log sequence indicator associated with the transaction has been used to update the tracking file. To facilitate this, the tracking file 318 may act as a pseudo slave, meaning that a transaction is committed if and only if the tracking file 318 has acknowledged the highest log sequence indicator associated with the transaction.

To increase the efficiency of storage usage, allocating the second portion of storage may comprise re-allocating a part of the first portion of storage that has been allocated to a subset of the set of log files 300 that have been updated. It is not essential to permanently store all log files and so the database system regularly cleans up the oldest log files so that the set of log files 300 do not grow too large. To this end, a subset of the set of log files that have been updated, such as the oldest log files which are currently stored, may be re-used to record further operations on data stored in the database 102a. The subset of log files which are to be re-used are obsolete. Log files may be obsolete if the transactions to which they relate have been completed and the log files are no longer to be used for replicating to other databases or for restoring a state of the database. Log files may become obsolete dependent on the time at which an oldest snapshot was taken, as will be discussed later in the section titled Deleting Binary Large Objects. Where log files are associated with, or comprise, a log file identifier, re-allocating a part of the first portion of storage that has been allocated to the subset of the set of log files may involve modifying one or more log file identifiers of the subset of log files. The log file identifiers are modified such that the log file identifiers indicate which subset of log files are to be used to record further operations to be performed to data stored in the database 102a. Although the subset of log files may still comprise data corresponding to operations that have been performed to data stored in the database, any pages in a log file whose log sequence indicator does not match a log sequence indicator determined based on the log file identifier of the associated log file and an offset into the associated log file may be treated as invalid. Before re-allocating the part of the first portion of storage that has been allocated to the subset of updated log files, the method may include determining a size of an available portion of storage and re-allocating the part of the first portion of storage if the available portion of storage is below a further predetermined value. Re-allocating a part of the first portion of storage that has been allocated to a subset updated log files may be performed independently from the determination that the available portion of storage is below the predetermined threshold.

In some examples, the tracking file 318 is a first tracking file having a first indicator of a portion of the set of log files and the method comprises alternately updating the first tracking file having the first indicator of a portion of the set of log files and updating a second tracking file having a second indicator of a portion of the set of log files. In known systems, if a database system crashes while updating a tracking file, the indicator relating to a portion of a set of log files in the tracking file can become corrupted or inaccessible. Providing two tracking files, which are alternately updated, provides greater resilience to corruption during a crash as only one tracking file is being updated at a time. The first and second tracking files may be embodied as a single logical tracking file comprising two log sequence indicators of respective most recently generated log records at the time each respective first and second tracking file was updated and a checksum for each of the first and second tracking files. Following a crash, the database system treats any tracking file having a checksum which does not match as invalid. Further, when determining which tracking file to use to locate the most recently updated portion of the set of log files, the database system compares the log sequence indicators in each tracking file, or block, and uses the tracking file or block with the highest log sequence indicator as the indicator of the most recently updated portion of the set of log files. In some examples, the first and second tracking file may be a first pair of tracking files and the computer implemented method comprises updating a plurality of pairs of tracking files. Where a database system may have multiple operations writing to the pairs of tracking files simultaneously, there may be a plurality of pairs of tracking files. A pair of tracking files may be a single tracking file comprising two blocks and the plurality of pairs of tracking files may be a plurality of block pairs of a single tracking file.

The set of log files may be truncated periodically or in response to predetermined events. Truncating a log is generally the process of reducing the size of the log by removing log records corresponding to old transactions. In the examples described herein, it may not be possible to physically truncate the set of log files as the log files have a predetermined size. In this case, the set of log records can be logically truncated by treating any log records which would be physically deleted as invalid. Truncating the set of log files decrements the log sequence indicators used for recording new log records. Consequently, selecting a tracking file with the highest log sequence indicator may not be sufficient to locate the most recently updated portion of the set of log files. Accordingly, the tracking file may comprise a version indicator which is incremented during each truncation. When accessing the tracking files, the tracking file with the highest version indicator may be used to identify the most recently update portion of the set of log files. If multiple tracking files have the same version indicator, then the tracking file comprising the highest log sequence indicator may be selected.

Generating Snapshots

A snapshot of the database 102a can be used during recovery of the database 102a or when re-provisioning a node in the database system 100. There may be a master node and one or more slave nodes, wherein the slave nodes are configured to replicate the master node. When recovering the database 102a or re-provisioning a node in a database system 100 using a snapshot, the database system 100 first initializes a snapshot of the database 102a and then replays log records in the set of log files which relate to certain transactions, the results of which were not included in the snapshot. To reliably recover the database 102a or re-provision a node, log records corresponding to transactions, the results of which were included in the snapshot, should not be replayed. The logical order of transactions being performed to data stored in the database are not necessarily the same as the order of the corresponding log records stored in the log files. At the start of a transaction one or more operations corresponding to the transaction are performed in an isolated manner such that the result of the one or more transactions are not visible on, or persisted to, the database. A log record having a position in the log file is subsequently reserved and the one or more operations are recorded in the reserved log record. The transaction can be committed once the one or more operations have been recorded in the log record. A data entry corresponding to the transaction is generated when committing the transaction. The transaction and the associated data entry are assigned a logical order when committing, the logical order corresponding to a time at which the data entry was generated. The log record may be considered as fully generated once the transaction is committed. A first transaction may begin at a first time and reserve a log record with a first position, and a second transaction may begin at a second time, after the first time, and reserve a log record with a second position. If the second transaction is committed before the first transaction, then a data entry in the database generated according to the second transaction may have an earlier logical order in the database than a data entry in the database corresponding to the first transaction. However, the position of the log records is reserved before generating each respective data entry and so the log records may be out of order compared to the data entries in the database.

Figure 5:
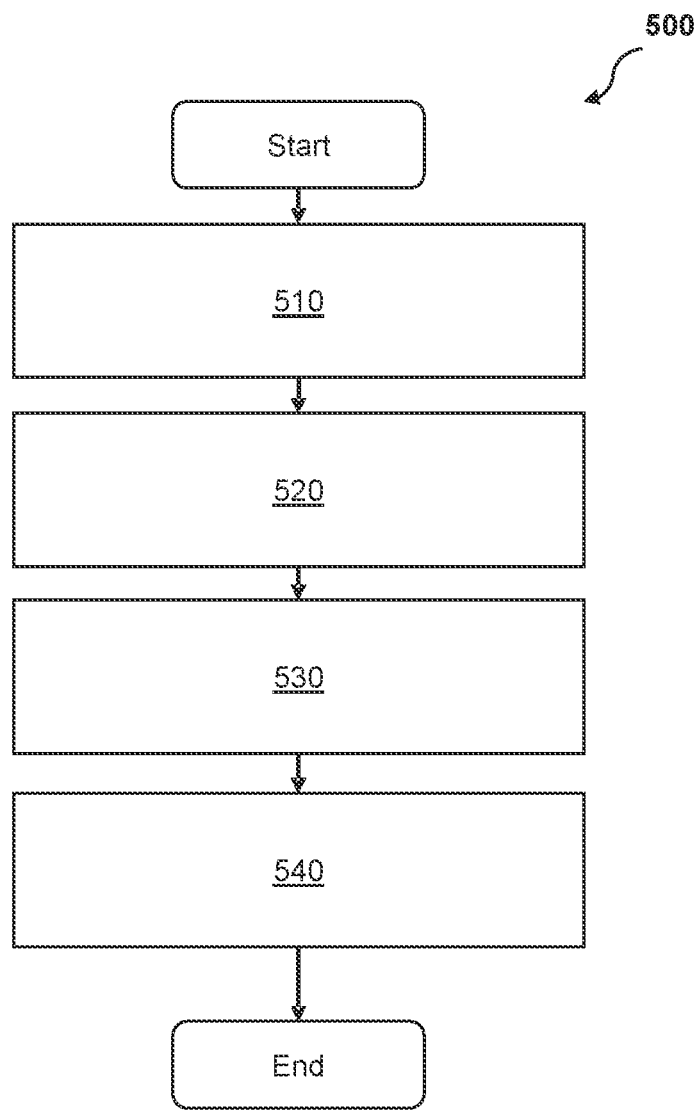
FIG. 5 shows a flow chart of a method of generating a snapshot according to an example.

FIG. 5 shows a flow chart of a method 500 for generating a snapshot representing a state of a database 102a at a given time. The method 500 will first be described in a particular order, but it will be appreciated that the method 500 may be performed in a different order to that initially described, as will become apparent. The method 500 comprises, at block 510, generating a data entry 114a in a database 102a, the data entry 114a being associated with a log record 112a for recording at least one operation corresponding to the data entry 114a. The log record 112a corresponds to a log sequence indicator. The data entry 114a is stored in a table in the database, and the data entry may be a row in a table or may comprise a plurality of rows each in a respective table. When committing a transaction corresponding to at least one operation on data stored in a table in the database, a new row is generated corresponding to a result of the at least one operation and the original entry in the table is maintained, at least for a period of time. In this way, each log record is associated with a data entry 114a in the database, and the data entry 114a is generated once the one or more operations corresponding to the data entry 114a have been recorded in the log record 112a. The method 500 comprises, at block 520, selecting a snapshot cutoff log sequence indicator. Selecting a snapshot cutoff log sequence indicator involves reserving a log sequence indicator corresponding to a position in set of log files such that no log record may be associated with the selected snapshot cutoff log sequence indicator. In some examples, generating a snapshot is performed as a transaction and a corresponding log record is generated in the set of log files and is written out to the snapshot, wherein the snapshot cutoff log sequence indicator is the log sequence indicator of the log record corresponding to the snapshot. The method 500 comprises, at block 530, determining a relative order of the log sequence indicator, corresponding to the data entry, and the snapshot cutoff log sequence indicator. At block 540, the method 500 comprises, generating a snapshot representing a state of the database 102a at a time corresponding to the snapshot cutoff log sequence indicator, wherein the snapshot comprises the data entry 114a in dependence on the determined relative order. The log sequence indicator for the log record corresponding to the data entry is selected before generating the data entry 114a. The data entry is generated once the at least one operation has been recorded in the reserved log record 112a. Selecting a snapshot cutoff log sequence indicator, and including the data entry 114a in dependence on a relative order between a log record 112a corresponding to the data entry and the snapshot cutoff log sequence indicator, means that the when recovering a state of the database by replaying log records, the system can replay any log records that were reserved after the snapshot cutoff log sequence indicator. As the log records do not have to be selectively replayed, an indicator of a time at which the associated data entry is generated does not need to be selected and stored in the log record until after the data entry has been generated. If the snapshot were to be generated by selecting a position of a data entry in the database, and including data entries before this position, then the corresponding log records may be assigned an indication of a relative position of their associated data entry in comparison to the snapshot. Similarly, if the snapshot is generated by selecting a time at which an entry in the database is generated, then the corresponding log records may be assigned an indication of the time at which their associated data entry is generated in comparison to the selected time. As the log record is reserved before a data entry is generated, and as the database system must track which log records to replay following a crash, a position or time of generation for the data entry in the database would be selected before the data entry is fully generated. Selecting a time at which the data entry is generated before the data entry is fully generated, i.e. committed, can lead to dirty reads, wherein uncommitted data is readable by an end user or an application before it is fully generated.

Figure 6A:
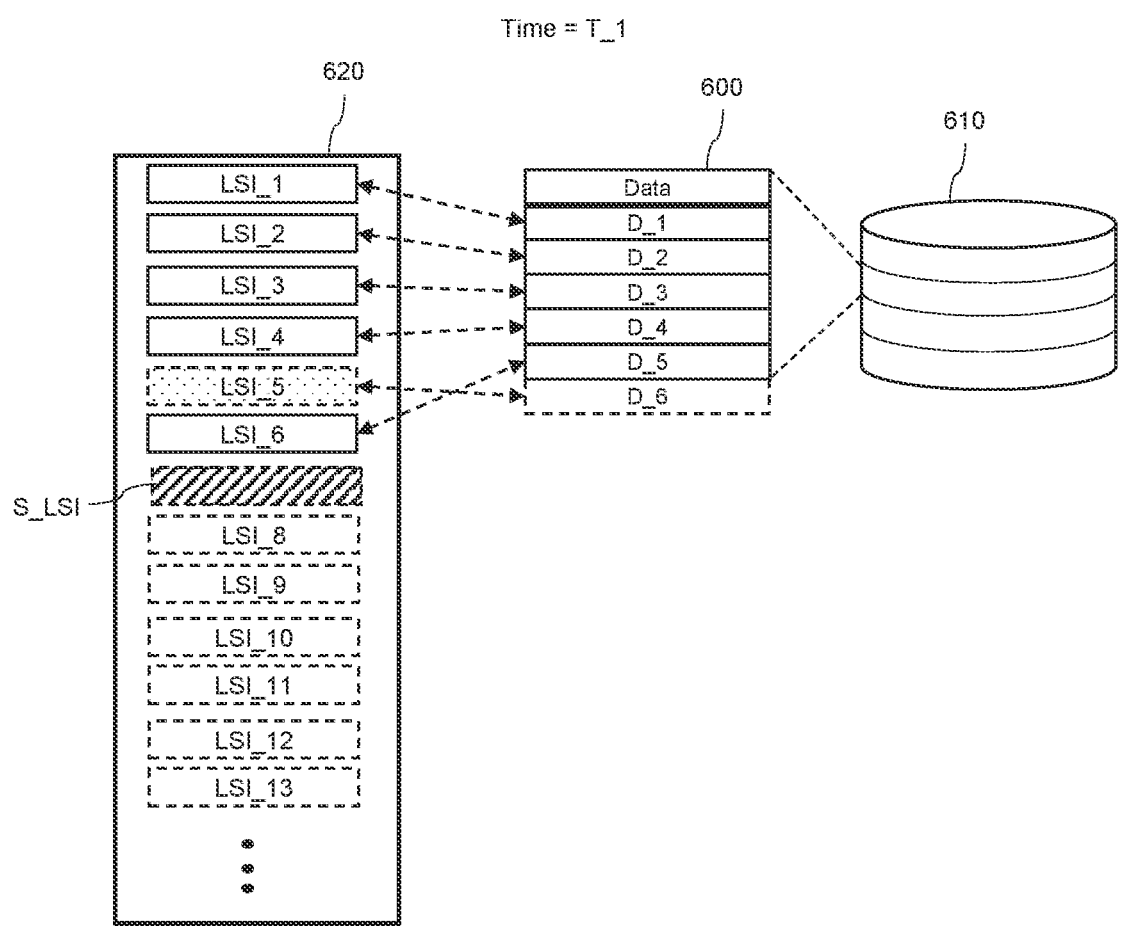
FIG. 6A shows schematically a set of data entries and a set of log files during a snapshot process at a first time according to an example.

FIG. 6A shows schematically at a first time T_1 a set of data entries 600 stored in a database 610. Each data entry corresponding to a log record of a plurality of log records stored in a set of log files 620. Log records are associated with log sequence indicators, LSI_1-6, corresponding to their position in the set of log files 620. As discussed above log records may be reserved at the start of a transaction and data entries associated with the log records may be generated at the end of the transaction once the one or more operations have been recorded in corresponding log records. At time T_1, the database comprises a set of data entries D_1 to D_5, each associated with a respective log record in the set of log files 620 as indicated by the arrows shown in broken lines in FIG. 6A. At time T_1 a log record corresponding to a log sequence indicator LSI_5 has been reserved but the transaction has not yet been committed and hence a corresponding data entry D_6 has not yet been generated. Data entries may be reserved but may not be considered to be generated until they have persisted to the database. At time T_1 a snapshot cutoff log sequence indicator, S_LSI has been selected. We will now consider which data entries are to be included in the snapshot in FIG. 6A.

Data entry D_4 has been generated before time T_1 and is associated with a log record corresponding to LSI_4. After selecting the snapshot cutoff log sequence indicator, S_LSI, the method comprises determining a relative order of log sequence indicator LSI_4, and the snapshot cutoff log sequence indicator, S_LSI. The data entry D_4 will be included in the snapshot if it is determined that LSI_4 is earlier in the set of log files 620 than S_LSI. In some examples, the data entry, D_4, may comprise the log sequence indicator, LSI_4, and determining the relative order may comprise comparing the log sequence indicator, LSI_4, in the data entry, D_4, with the snapshot cutoff log sequence indicator, S_LSI.

Data entry D_6, shown in broken lines, has not yet been generated at the time, T_1, which is when the snapshot cutoff log sequence indicator is selected. As discussed above, a log sequence indicator is selected before generating the data entry in the database. In FIG. 6A, log sequence indicator, LSI_5 has been selected before the snapshot cutoff log sequence indicator, S_LSI, was selected but the data entry, D_6, has not yet been generated. If the log record, LSI_5 has an earlier order than the snapshot cutoff log sequence indicator, S_LSI, the method may comprise waiting for the data entry D_6 corresponding to the log record LSI_5 to be generated before generating the snapshot. To facilitate this, the database system may maintain a list of one or more active transactions. Entries in the list of active transactions are associated with log sequence indicators of log records recording respective transactions. In this case, the method comprises identifying entries in the list of active transactions which are associated with log sequence indicators having an earlier order than the snapshot cutoff log sequence indicator and waiting for the identified transactions to complete before generating the snapshot.

Figure 6B:
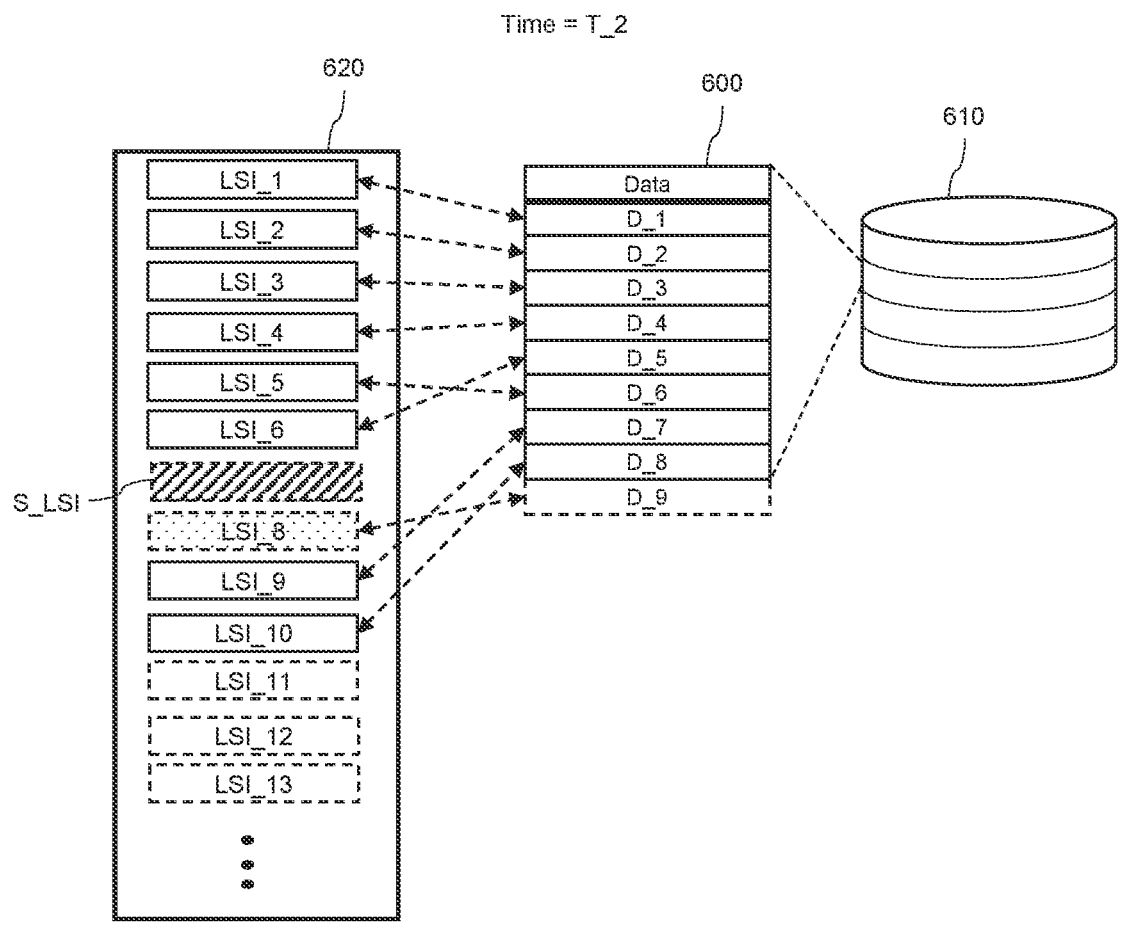
FIG. 6B shows schematically the set of data entries and the set of log files during a snapshot process at a second time according to an example.

FIG. 6B shows schematically at a second, later, time T_2 the set of data entries 600 stored in the database 610. Once the snapshot cutoff log sequence indicator S_LSI is selected, the database system does not block any transactions from being performed and so log records are continually added to the set of log files 620. In FIG. 6B, following the selection of the snapshot cutoff log sequence indicator S_LSI, a log record corresponding to LSI_8 has been reserved, although the corresponding transaction has not yet been completed. Log records corresponding to LSI_9, and LSI_10 have been generated, as have their associated data entries D_7 and D_8. The transaction corresponding to log sequence indicator LSI_5 has now been completed and the associated data entry D_6 has been generated. At time T_2 the snapshot is then generated and comprises data entries D_1 to D_6 following a determination of the relative order of their corresponding log sequence indicators and the snapshot cutoff log sequence indicator S_LSI.

Figure 7:
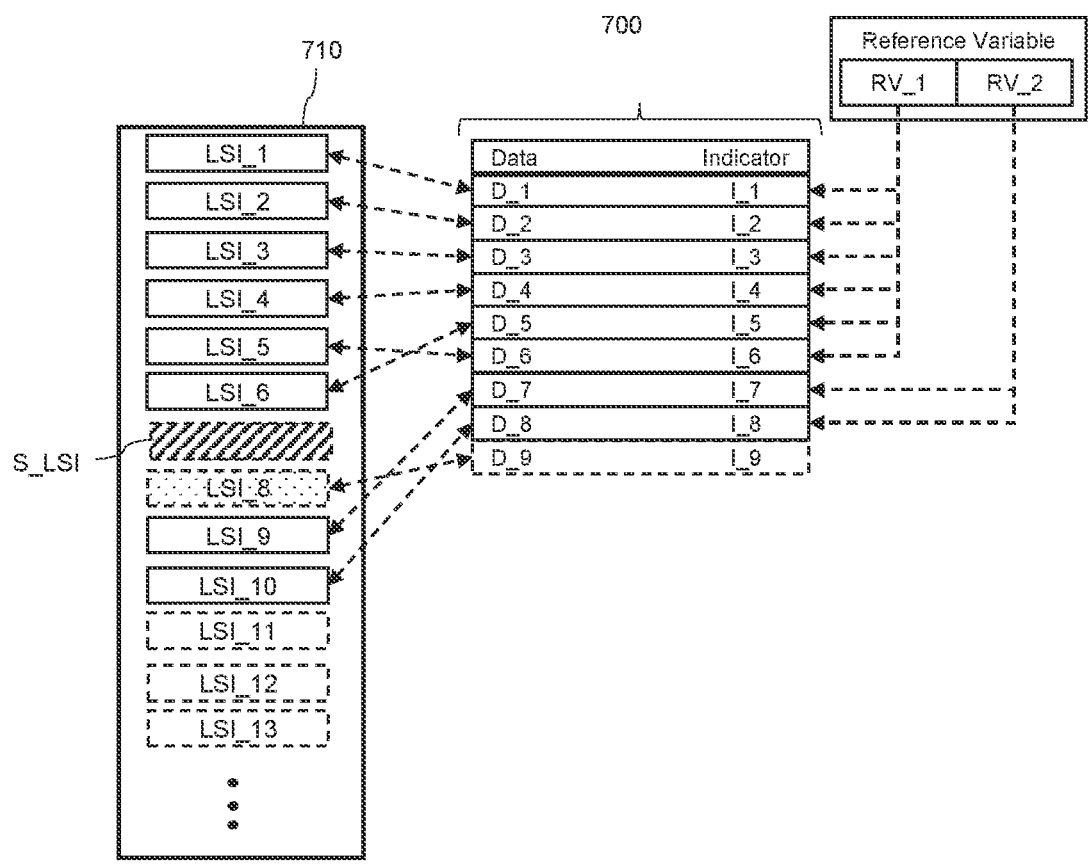
FIG. 7 shows schematically a set of data entries and a set of log files during a snapshot process according to an example.

Referring to FIG. 7, in some examples, a data entry comprises an indicator of the determined relative order of the log sequence indicator and snapshot cutoff log sequence indicator. This allows the snapshot to selectively include the data entry in dependence on the indicator of the determined relative order without having to perform a comparison for each data entry during the snapshot process. Data entries D_1 to D_8 comprise such indicators. Generating data entries D_1 to D_9 in FIG. 7 involves generating the indicator I_1 to I_8 of the relative order of a log sequence indicator, corresponding to the data entry, and a snapshot cutoff log sequence indicator based on a global reference variable. Selecting the snapshot cutoff log sequence indicator comprises selecting a next available log sequence indicator and immediately thereafter modifying the global reference variable. This will be explained with reference to D_6 shown in FIG. 7: first, the at least one operation corresponding to the data entry D_6 is performed but is not yet persisted to the database. A log record corresponding to log sequence indicator LSI_5 is subsequently reserved and a value RV_1 is read from the global reference variable. The at least one operation is then recorded in the reserved log record corresponding to log sequence indicator LSI_5. The data entry D_6 is then generated comprising the read value RV_1 from the global reference value. When the snapshot cutoff log sequence indicator, S_LSI, is selected the global reference variable is modified such that it becomes value RV_2. Transactions for which a log record is reserved, and a log sequence indicator is selected, after the snapshot cutoff log sequence indicator is selected, will read the value RV_2 from the global reference variable. For example, where the log sequence indicator LSI_9 is selected, the value RV_2 is read from the global reference variable. In this way, any data entries relating to transactions which begin logging their operations after the snapshot cutoff log sequence indicator, S_LSI, is selected, will comprise a different indicator of a determined relative order than those which began logging their operations before the snapshot cutoff log sequence indicator was selected. By reading a value from the global reference variable immediately after reserving the log record, then if a snapshot cutoff log sequence indicator S_LSI is selected, and the global reference variable modified before the data entry is fully generated, the data entry will still include a value RV_1. The value RV_1 indicating that the transaction relating to the data entry began before the snapshot cutoff log sequence indicator S_LSI was selected. Using an indicator of a determined relative order based on a global reference variable may be less memory intensive and/or may use less storage than storing a log sequence indicator in the data entry. In examples where there are millions or even billions of data entries, reducing the size of each data entry may be of particular benefit.

A set of log files may have millions of log records and correspondingly log sequence indicators may be large variables, therefore storing a log sequence indicator would use a large amount of storage. Consequently, using an indicator of the relative order of the snapshot cutoff log sequence indicator and the log sequence indicator corresponding to the data entry may be a more efficient way of quickly determining the relative order when taking a snapshot. Writing the indicator to the data entry when the data entry is generated prevents an extra write operation having to be used to generate the indicator. The global reference variable may have a value determined from a set of snapshot values and when generating a snapshot, the global reference variable is modified such that it changes from a first snapshot value to a second snapshot value. The set of snapshot values may comprise enough values to represent each snapshot currently being stored. When generating a new snapshot, an oldest snapshot may be deleted and the snapshot value corresponding to the oldest snapshot may be used as the snapshot value for the current snapshot. Re-using snapshot values when corresponding snapshots are deleted allows the global reference variable to be small.

The indicator of a determined relative order of the log sequence indicator and the snapshot cutoff log sequence indicator for each data may comprise a first part and a second part. The first part being an indicator of a time at which the data entry was generated, and the second part being generated based on the global reference variable. The indicator of the time at which the data entry was generated may be a unique value, such that no two data entries have the same indicator. When generating a data entry, a transaction ID may be selected, identifying a time at or a logical order in which the transaction was completed, and the data entry was generated. These transaction IDs may be generated for other purposes and repurposed by the current method. By using a combination of an indicator of a time at which the data entry was generated, and a second part that is generated based on the reference variable, the data entry may store a small amount of excess information to provide the functionality described herein. The second part based on the reference variable may be represented by a small portion of data representing a set of values wherein the set of values are recycled. The first part may already be stored in the data entry for other purposes.

In an example, generating a snapshot involves selecting an indicator corresponding to a relative time of the snapshot in comparison to the time at which the data entry was generated, such as a transaction ID. Including a data entry in the snapshot may be dependent on a determination that the indicator corresponding to the relative time of the snapshot in comparison to the time at which the data entry was generated indicates that the snapshot is to be generated at a later time than the time at which the data entry was generated. Alternatively, or additionally, including the data entry in the snapshot may be dependent on a determination that the second part, generated based on a global reference variable, corresponds to a value representing the global reference variable prior to the global reference variable being modified. The indicator corresponding to the relative time of the snapshot in comparison to the time at which the data entry was generated is selected prior to selecting the snapshot cutoff log sequence indicator.

Figure 8:
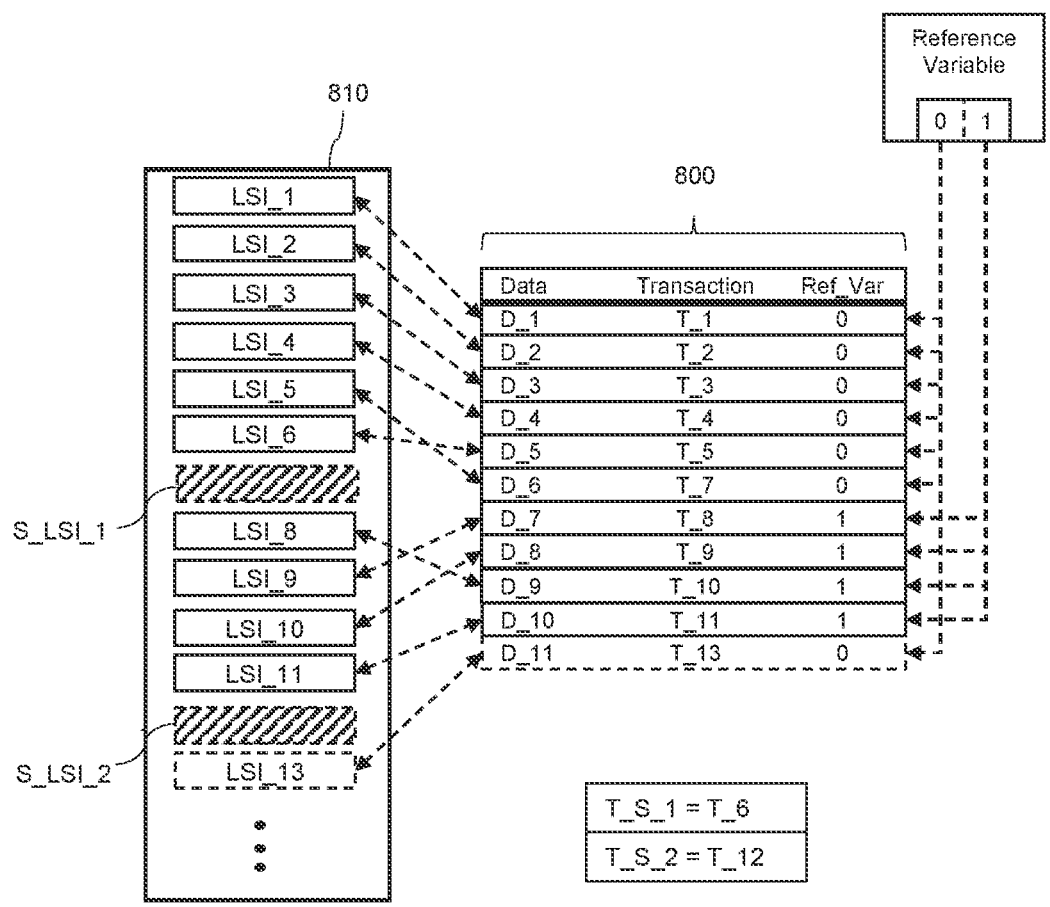
FIG. 8 shows schematically a set of data entries and a set of log files during a snapshot process according to an example.

FIG. 8 shows schematically a set of data entries 800 each data entry corresponding to a log record in a set of log files 810. Each data entry of the set of data entries 800 includes an indicator of a determined relative order of a corresponding log sequence indicator and a snapshot cutoff log sequence indicator, S_LSI_1, S_LSI_2. The indicator comprises a first part ("Transaction" column in FIG. 8), which is an indicator of the time at which the data entry was generated. For example, a time when a transaction which generated the data entry was completed. The indicator also includes a second part ("Rev_Var"), which is generated based on the global reference variable. The indicator of a time at which a data entry was generated may not be an indicator of an actual time but instead may be an indicator of a logical time in a database system when each subsequent transaction is assigned, or may be used to select, a logical time higher than the previous transaction. The global reference variable in FIG. 8 is a bit having a value of 0 or 1 and modifying the global reference variable comprises flipping a value of the bit. At a time before the snapshot cutoff log sequence indicator S_LSI_1 is selected, the global reference variable bit has a value of 0. For a transaction which begins and for which a log sequence indicator is selected before the snapshot cutoff log record is selected, for example a transaction corresponding to a log record LSI_6, reading the global reference variable will result in a bit value of 0. A data entry D_5 generated according to such a transaction will comprise the bit value of 0. As data entries are generated, they are written to the database with an indicator, such as a transaction ID, of a time at which they are generated. This indicator of a time at which they are generated also indicates a relative order in which the transaction which generated the data entry was completed in comparison to other transactions. At the same time, or before selecting the snapshot cutoff log sequence indicator, another indicator, T_S_1, T_S_2, of a relative time of the snapshot in comparison to the time at which data entries are generated may also be selected. This indicator is used to determine which transactions have been completed at the time the snapshot begins. Data entry D_6 corresponding to the log sequence indicator LSI_5 was not generated before the time at which the snapshot cutoff log sequence indicator, S_LSI_1, is selected and hence in this case is also not generated before the indicator of the relative time of the snapshot, T_S_1, has been selected. Consequently, when the data entry D_6 is generated it may have an indicator, T_7, of a time which is after the time of the snapshot, T_S_1=T_6. However, as the global reference variable is read immediately after the log record corresponding to LSI_5 is reserved and as the global reference variable is modified immediately after selecting the snapshot cutoff log sequence indicator S_LSI_1, the snapshot will comprise the data entry D_6 due to the Ref_Var stored in the data entry D_6 being 0. As the system progresses and a further snapshot is generated having snapshot cutoff log sequence indicator S_LSI_2, the global reference variable bit value will be switched back from 1 to 0. Data entries which are generated according to transactions commencing after the second snapshot cutoff log sequence indicator is selected will have the same Ref_Var as those which commenced before the first snapshot cutoff log sequence indicator S_LSI_1 was generated. However, as discussed above, generating a snapshot involves waiting for data entries corresponding to log records associated with log sequence indicators having an earlier order than the snapshot cutoff log sequence indicator S_LSI_1 to be generated in the database before generating the first snapshot. Consequently, data entries corresponding to log records which were reserved and/or generated before the first snapshot cutoff log sequence indicator was selected will have an indicator of a time at which the data entry was generated corresponding to an earlier time than the relative time of the second snapshot, T_S_2.

In an example involving restoring a state of the database at a time after the time corresponding to the snapshot cutoff log sequence indicator, it may be possible to restore the database by restoring a state of the database from the snapshot and replaying any log records which were reserved after the snapshot cutoff log sequence indicator was selected. This increases the efficiency of replaying the log records as the database system can replay any log records that have been generated after the snapshot log sequence indicator was selected. The database system does not have to selectively replay log records based on a further determination of whether the log record corresponds to a data entry which is included in the snapshot.

Replicating Binary Large Objects

The database system 100 may replicate a first database 102a at a second database 102b, for example where the two databases 102a and 102b are a master database and a slave database respectively. This allows users of the database to more effectively query data stored in the databases without burdening the first database 102a. Having a second database 102b which is a replication of the first database 102a also provides a backup. Replicating a first database at a second database comprises initializing a snapshot of the first database 102a at the second database 102b and sending log records 112a, corresponding to operations that have been performed to data stored at the first database 102a, to the second database 102b to be replayed on the second database 102b. The second database then replays log records which were recorded after the snapshot was generated. Transactions, corresponding to the log records, are performed as the log records are written into a set of log files 110b at the second database 102b. Sending the log records to the second database 102b may comprise sending the log records to be replayed at the second database 102b. The log records may not be actually received by the second database 102b but may be received elsewhere and written to a set of log files 110b corresponding to the second database 102b at a later time. The combination of a set of log files, a database, and any number of snapshots may be referred to generally as a database. Binary large objects are generally large files, comprising image, sound, video, or other multimedia files, and stored as a collection of binary data. Handling binary large objects in a database may be difficult due to the comparative lack of associated classifying information in comparison to data stored in tables in the database. Binary large objects are not of any particular size. In some cases where the binary large objects are large objects, handling the binary large objects is further exacerbated by their size. However, in other cases binary large objects may be comparatively small files.

Figure 9:
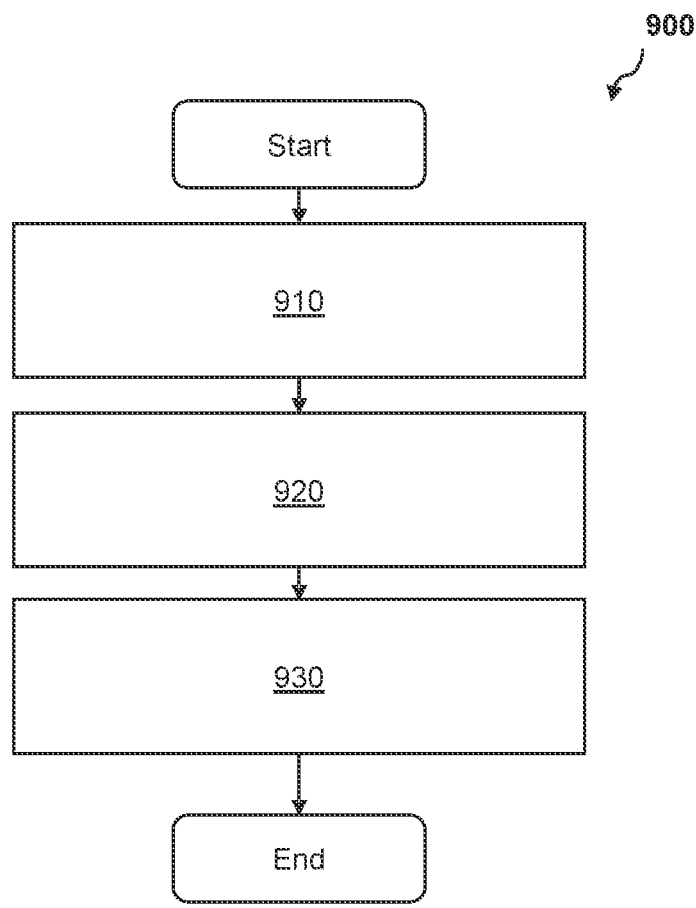
FIG. 9 shows a flow chart of a method for replicating one or more binary large objects according to an example.

FIG. 9 shows a flow chart of a method 900 for replicating a binary large object stored at a first database to a second database. The first database is associated with a set of log records. The set of log records correspond to operations performed to data stored at the first database. As discussed above, a log record may comprise data indicative of a transaction, a transaction being one or more operations performed to data stored at a database. Operations performed to data stored at the first database include reading, writing, or modifying data stored at the first database, including writing new data to the database. A database system may receive queries from end users or applications accessing the database system, wherein the queries specify one or more transactions to be performed. Queries are received in the form of suitable computer code, for example, queries may be received in the form of structured query language (SQL) or any other suitable computer code.

The method 900 comprises at block 910 sending a set of log records corresponding to operations performed to data stored at the first database to the second database. Sending the set of log records to the second database comprises sending the set of log records to be written to a set of log files associated with and/or stored at, the second database. The set of log files associated and/or stored at the second database being for recording operations performed to data stored at the second database.

At block 920, the method 900 comprises identifying a log record of the set of log records comprising an indication of a binary large object stored at the first database. When a binary large object is generated at the first database, a special log record is generated which comprises data indicative of the binary large object having been generated at the first database. The special log record may be stored with log records corresponding to operations performed to row store data stored in the first database. When sending log records to the second database the special log record is identified. At block 930, the method 900 comprises, in response to identifying the log record comprising the indication of the binary large object stored at the first database, sending the binary large object stored at the first database to the second database. Sending the set of log records involves reading the set of log files into memory, identifying a log record in the set of log files comprising an indication of the binary large object stored at the first database, and subsequently sending the set of log files and the binary large object to the second database. Sending the binary large object to the second database in response to identifying the log record comprising the indication of the binary large object allows the binary large object to be generated at the second database while writing the identified log record to the set of log files associated with and/or stored at the second database. A transaction corresponding to a log record comprising an indication of a binary large object stored at the first database, when replicating at the second database cannot be committed until the binary large object to which the log record corresponds has been received at the second database. Where the log record corresponds to a transaction for generating the binary large object, the transaction may only be committed, once the binary large object has been received at the second database and the transaction is recorded in a log file corresponding to the second database. Sending the binary large object in response to identifying the log record reduces the time for which the database system has to wait before committing a transaction corresponding to the identified log record at the second database. This increases the speed of replication of the first database at the second database. Where binary large objects and log records are sent independently to the second database, a log record corresponding to the binary large object may be received at the second database but a corresponding transaction may not be committed until the binary large object has also been received at the second database, and so the database system would have to maintain an active transaction until the binary large object is received.

Figure 10A:
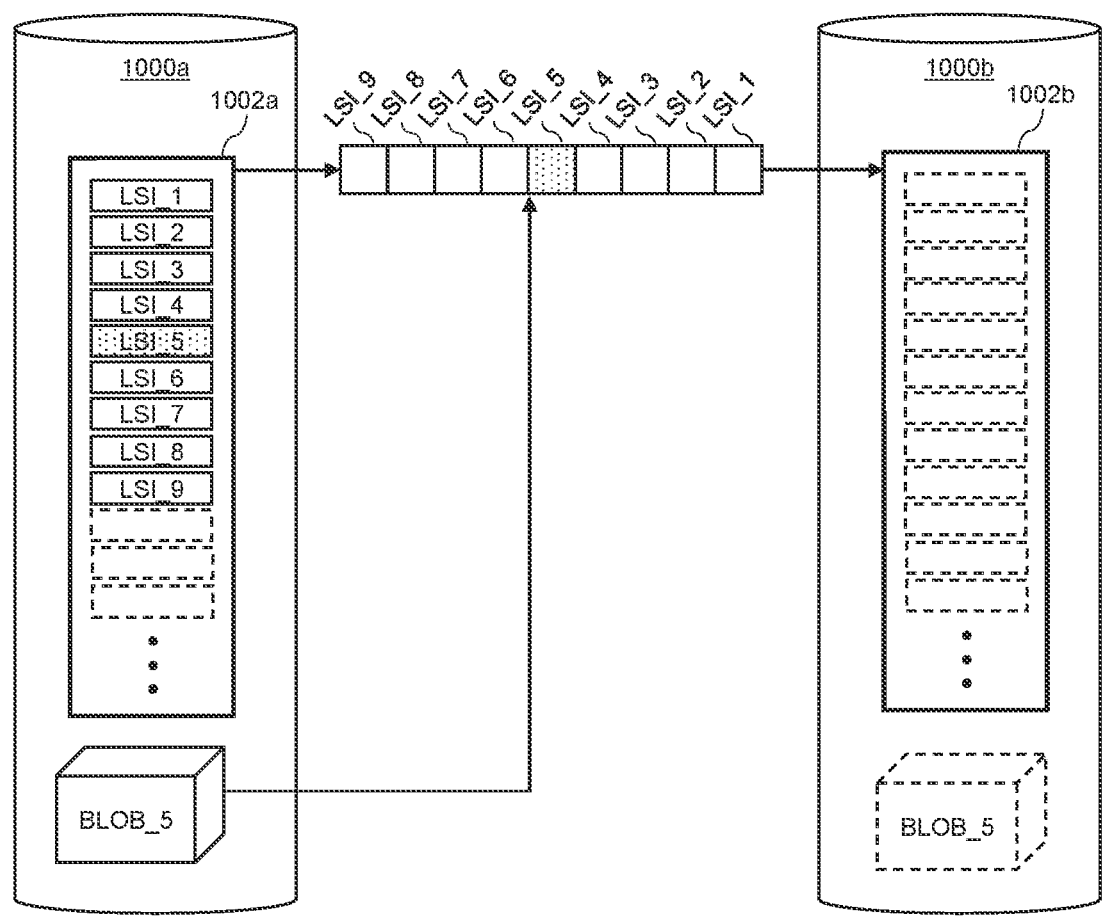
FIG. 10A shows schematically a first database and a second database during a replication process according to an example of the method shown in FIG. 9.

FIG. 10A shows schematically a first database 1000a, a first set of log files 1002a comprising a plurality of log records each corresponding to a log sequence indicator, LSI_1-9. A binary large object, BLOB_5 is stored at the first database 1000a. In FIG. 10A, the set of log files 1002a and the binary large object, BLOB_5, are shown as being stored in the first database 1000a, although it will be appreciated that they may not be stored within the first database 1000a. For example, the binary large object BLOB_5 may be stored separately from the first database 1000a, in a separate directory or file system, but associated with the database 1000a such as where the database includes data identifying the binary large object BLOB_5. FIG. 10A also shows a second database 1000b, and a second set of log files 1002b. The second database 1000b may be configured to replicate the first database 1000a. FIG. 10A may relate to a first time at which the set of log records in the set of log files 1002a being sent to the second database 1000b. In FIG. 10A, the log record comprising an indication of the binary large object, BLOB_5 is the log record corresponding to the log sequence indicator LSI_5.

The set of log records corresponding to operations performed to data stored at the first database 1000a are sent to the second database 1000b in a sequence and sending the binary large object BLOB_5 to the second database includes inserting the binary large object BLOB_5 into the sequence after the log record comprising the indication of the binary large object BLOB_5. Inserting the binary large object into the sequence of the set of log files may involve sending the binary large object BLOB_5 using a same process, or as part of a transaction, which includes sending the set of log records to send the BLOB_5.

As shown in FIG. 10A, the binary large object BLOB_5 may be inserted into the sequence immediately after the log record comprising the indication of a binary large object stored at the first database. Inserting the binary large object BLOB_5 into the sequence immediately after the log record allows the binary large object to be received at the second database 1000a immediately after the log record comprising the indication of the binary large object, corresponding to log sequence indicator LSI_5. This reduces the time taken to write the log record to the second set of log files 1002b and to commit a transaction corresponding to the log record.

The binary large object BLOB_5 stored at the first database is associated with log sequence indicator LSI_5 in a table or a file. Associating the binary large object with the log sequence indicator LSI_5 enables the system to locate the binary large object BLOB_5 following the identification of the log record comprising the indication of the binary large object BLOB_5.

Figure 10B:
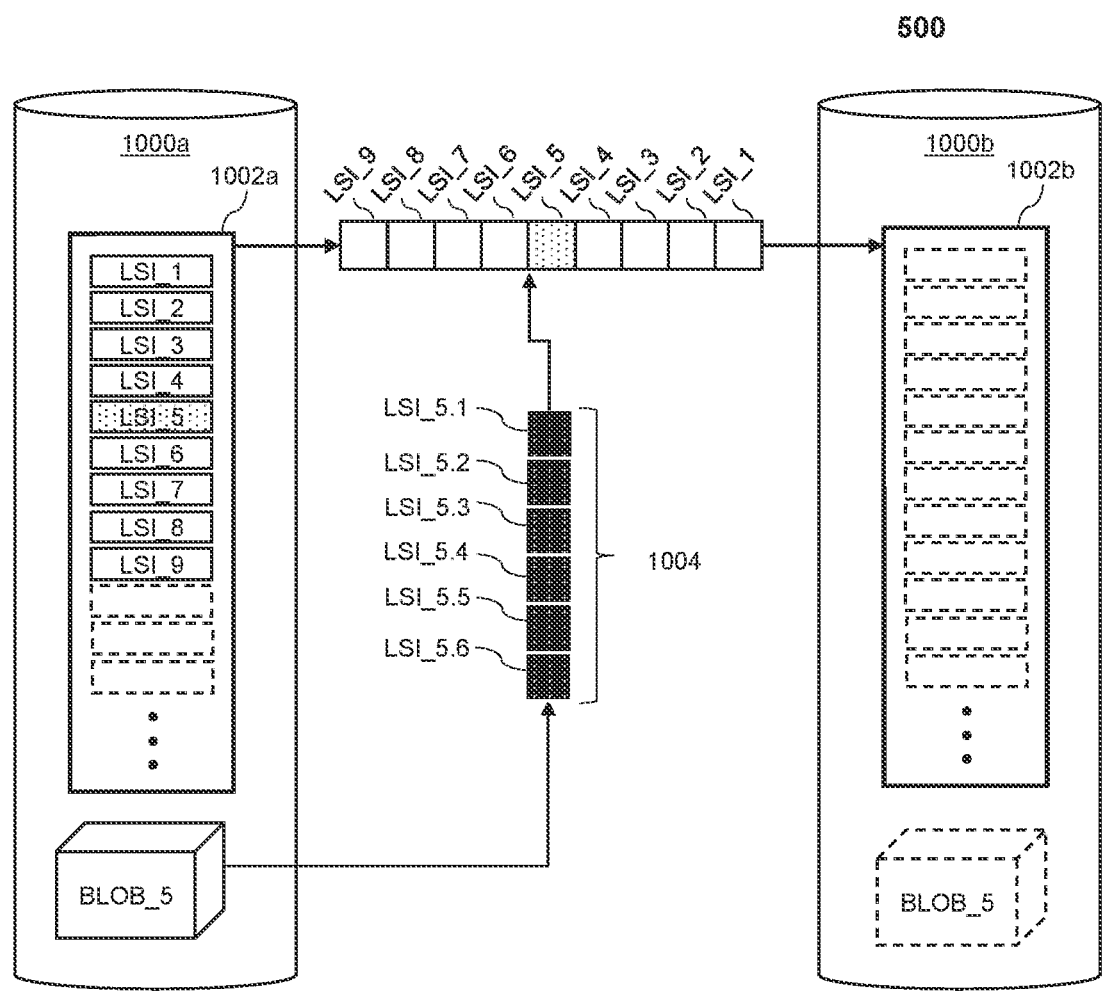
FIG. 10B shows schematically a first database and a second database during a replication process according to an example of the method shown in FIG. 9.

FIG. 10B illustrates a process of sending the binary large object BLOB_5 to the second database in one or more parts. Each part is associated with a respective indicator comprising a first portion and a second portion. The first portion is associated with the log sequence indicator LSI_5, corresponding to the log record comprising the indication of the binary large object BLOB_5. The second portion indicates the part of the binary large object. More specifically, FIG. 10B shows the binary large object BLOB_5 being sent to the second database in a plurality of parts 1004. Each part of the plurality of parts 1004 is associated with an indicator having a first portion, LSI_5, and a second portion indicating the part of the binary large object BLOB_5. The binary large object BLOB_5 is sent as one or more pages, each page being associated with a two-part indicator as described above. By sending the binary large object as one or more parts each comprising an indicator having a first and second portion it becomes possible to send the one or more parts of the binary large object to the second database out of order in the sequence or with other log records sent in-between the one or more parts of the binary large object.

The method 900 may also comprise reserving a portion of storage at the second database for storing the log record. For example, once the log record is identified, one or more pages in the set of log files 1002b may be reserved for storing the log record. This may be performed before the log record is sent to the second database such that the position in the second set of log files 1002b and the resources for storing the log record are reserved before sending the log record. The method 900 may also comprise prior to sending the binary large object BLOB_5 to the second database, generating a file at the second database 1000b for storing the binary large object. The file at the second database 1000b may be associated with the binary large object BLOB_5. Generating the file comprises reserving enough pages to store the binary large object BLOB_5 at the second database 1000b. This ensures that the resources at the second database 1000b for storing the binary large object BLOB_5 and the associated log record are available when the binary large object BLOB_5 and the log record are received at the second database 1000b.

The method 900 may also comprise receiving each of the one or more parts 1004 of the binary large object BLOB_5 at the second database 1000b and storing each of the one or more parts at the second database in dependence on the respective indicator. The respective indicator has a first and second portion, the first portion being associated with the log sequence indicator and the second portion indicating the part of the binary large object. The file generated at the second database may be associated with the log sequence indicator LSI_5 so that each part of the binary large object BLOB_5 is written to the file based on the indicator of the respective part.

The method 900 may also comprise storing the binary large object at the second database and maintaining the association between the binary large object and the log sequence indicator. The binary large object is stored and related to the log sequence indicator of the log record recording the operation which generated the binary large object by maintaining the log sequence indicator in a file comprising the binary large object. Alternatively, a table may be used to store associations between log sequence indicators and binary large objects stored at the second database. This allows the binary large object to be easily located for deletion or when sending log records in the set of log files 1002b of the second database 1000b to another database for replication. When writing data corresponding to the log records to the set of log files 1002b of the second database, further log records may be generated in the set of log files 1002b having different log sequence indicators than the log records of the first set 1002a. Correspondingly, the binary large object BLOB_5 may be stored at the second database 1000b and associated with a different log sequence indicator than LSI_5.

The binary large object may be stored at the second database 1000b in a directory according to at least a part of the log sequence indicator. Where there are more than one binary large objects stored at or to be stored at the second database 1000b, storing the binary large objects according to at least part of their respective log sequence indicators allows a binary large object to be easily located. When performing an operation on the binary large object or when replicating to a database the relative binary large objects can be easily located. When the second database 1000b is replicated to a third database, the set of log records 1002b may be sent to the third database, and once the log record comprising an indication of a binary large object is identified, the database system uses the log sequence indicator to locate a directory at the second database in which the binary large object is stored. Once the binary large object is identified in its respective directory it is then sent to the third database. The binary large object may be stored at the second database 1000b in a multi-level directory, each level of the multi-level directory corresponding to a respective part of the log sequence indicator. For example, a first level of the multi-level directory may be associated with a first part the log sequence indicator, such as a first portion of a string, an integer, or any other suitable variable used to record the log sequence indicator. Log sequence indicators may generally be increasing values and hence a first portion of the log sequence indicator can be used to define a first level of the multi-level directory and a second portion of the log sequence indicator can be used to define a second level of the multi-level directory. This efficiently stores the binary large objects such that they can be located without having to access a single directory comprising all binary large objects and iterating through the binary large objects therein. Where a large number of binary large objects are stored at a database, locating the binary large object associated with a log record may be non-trivial and so grouping the binary large objects according to their log sequence indicators provides an efficient way of sorting the binary large objects. Storing the binary large object in a multi-level directory as described above may also simplify a log truncation process where, when a log is truncated, binary large objects referenced by log records which are deleted during the log truncation should also be deleted. Rather than scanning through the log records and deleting binary large objects referenced by log records, the binary large objects may be deleted based on a directory in which they are stored being associated with a log sequence indicator below a truncation log sequence indicator. Here, a truncation log sequence indicator indicates a position in the set of log files below which all log records are to be truncated. Where there are a large number of binary large objects and associated log records, this process is more efficient than scanning the truncated portion of the set of log files and deleting binary large objects indicated by log records therein.

The log record comprising data indicating that the binary large object is stored at the first database may comprise a checksum generated from the binary large object. This allows the database system to check that the binary large object which is received at the second database matches the binary large object indicated by the log record. If the checksum corresponding to a binary large object is stored in the binary large object's corresponding log record, the checksum does not need to be stored in the file containing the binary large object, or in the filename of this file.

The identified log record may comprise data indicating a size of the binary large object and the method may comprise reserving space for the one or more parts of the binary large object in the sequence to send the binary large object based on the data indicating the size of the binary large object. Reserving sufficient space in the sequence to send the binary large object ensures the reliability of sending the binary large object as the space is reserved in the sequence before the binary large object is sent. The data indicating the size of the binary large object in the identified log record can be used to reserve a portion of storage at the second database for storing the binary large object.

The method 900 may also comprise sending an indication of the one or more parts of the binary large object to the second database. After receiving the one or more parts of the binary large object at the second database, an indication that the one or more parts of the binary large object have been received is generated. The log record comprising the indication of the binary large object may comprise data indicating the size of the binary large object and the number of pages used for the binary large object may be determined based on the size of the binary large object and the size of pages in the database system. Once all the pages of the binary large object which are to be received by the second database have been received an indication is generated. This allows the system to ensure that the binary large object is received at the second database. This indication may also be used to determine whether a transaction corresponding to replicating the binary large object at the second database is allowed to be committed, wherein a transaction corresponding to replicating the binary large object cannot be committed until the binary large object has been received and/or stored at the second database.

It may be possible for a log record comprising an indication of a binary large object stored at the first database to become invalidated or corrupted during storage or when sending the log record to the second database. Consequently, identifying a log record comprising an indication of a binary large object may comprise identifying an invalid log record and determining whether there is a binary large object associated with the log sequence indicator of the invalid log record.

Deleting Binary Large Objects

When deleting data from a database in a database system, the data is initially logically deleted, for example in response to a request from a user to delete the data, or when undoing a transaction which corresponds to generating the data. Logically deleting data comprises making the data inaccessible to an end user or to an application which queries the database. Data which is logically deleted may still be maintained at the database for a period of time such that pending transactions which rely on this data are able to be completed, such as where the data is being replicated to a further database. The logically deleted data may also be maintained for a period of time such that the database may be returned to a state before the data was logically deleted. After the period of time, the data which has been logically deleted may be physically deleted, which is to say permanently removed from the database. Data is not be physically deleted until snapshots which comprise the data have been deleted and log records which reference the data have been either deleted or invalidated. This helps to ensure that it is appropriate to physically delete the data. As discussed above a snapshot may represent a state of the database at a time corresponding to a snapshot cutoff log sequence indicator. A log record may be considered to be invalid if a log sequence indicator corresponding to the log record has a lower order than a snapshot cutoff log sequence indicator of an oldest snapshot representing a state of the database at a given time.

Figure 11:
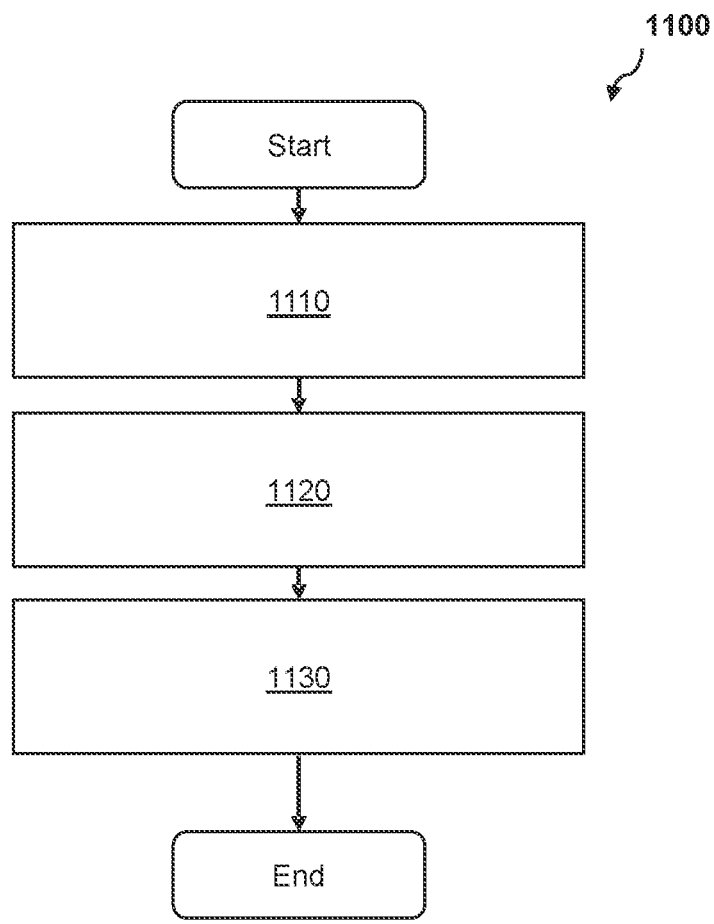
FIG. 11 shows a flow chart of a method for deleting large binary objects according to an example.

FIG. 11 shows a flow chart of a method 1100 for physically deleting one or more binary large objects from a database, wherein the database has a plurality of states, a first said state of the database at a first time being represented by a first snapshot. The first snapshot is generated based on method 500 described above. The first snapshot comprises a copy of the data stored at the database when in the first said state. The first said state of the database is a state of the database after transactions corresponding to log records having an earlier order in the set of log files than the snapshot cutoff log sequence indicator have been committed. In some examples, generating the snapshot may comprise storing the data from the first database in a different format than the format in which the data is stored in the database. Data stored at the database may be serialized into the snapshot, wherein serializing is a process of translating data structures or objects into a format which can be stored.

The method 1100 comprises, at block 1110, generating a second snapshot representing a state of the database at a second time, the second time being later than the first time and the second snapshot comprises data identifying one or more binary large objects that have been logically deleted from the database before the second time. When one or more binary large objects are logically deleted from the database, data identifying the one or more binary large objects which have been logically deleted is stored. Data identifying the one or more binary large objects that have been logically deleted may be stored in any suitable format. As discussed above, a binary large object may be associated with a log sequence indicator corresponding to a log record of a transaction which was performed to create the binary large object. Accordingly, storing data identifying a binary large object that has been logically deleted may comprise storing the associated log sequence indicator in a list or table of logically deleted binary large objects. When logically deleting a binary large object from the database a log record may be generated comprising data indicating the deletion of the binary large object. Storing data identifying the one or more binary large objects that have been deleted before the second time may comprise storing a list of log sequence indicators associated with binary large objects that have been logically deleted before the second time. The list may be serialized into the second snapshot such that it is stored in a suitable format for storage.

The method 1100 comprises, at block 1120, deleting the first snapshot. Snapshots are periodically deleted from the database system such that storage space can be freed for subsequent snapshots or for other uses. The database system may maintain a plurality of snapshots and new snapshots are generated periodically. New snapshots may be generated in response to a predetermined number of transactions having been performed since a previous snapshot. The database system performs a snapshot cleanup process in which one or more oldest snapshots of the plurality of snapshots are deleted, this may be performed periodically or in response to a predetermined event. At block 1130, the method 1100 comprises, subsequent to deleting the first snapshot, using the data identifying the one or more binary large objects that have been logically deleted before the second time to physically delete the one or more binary large objects from the database. As discussed above, deleting an oldest snapshot invalidates log records corresponding to log sequence indicators between a snapshot cutoff log sequence indicator of the oldest snapshot, which is deleted, and a snapshot cutoff log sequence indicator of the next oldest snapshot in the set of log files. Hence a binary large object which has been logically deleted between the oldest snapshot and the next oldest snapshot is allowed to be physically deleted after the oldest snapshot is deleted. Storing data identifying the one or more binary large objects that have been logically deleted before the second time in the second snapshot allows the first snapshot to be deleted safely while still being able to locate the one or more binary large objects to be physically deleted. Grouping and storing the data identifying the one or binary large objects, that have been logically deleted, in the second snapshot allows the binary large objects to be efficiently identified and permanently deleted.

Figure 12:
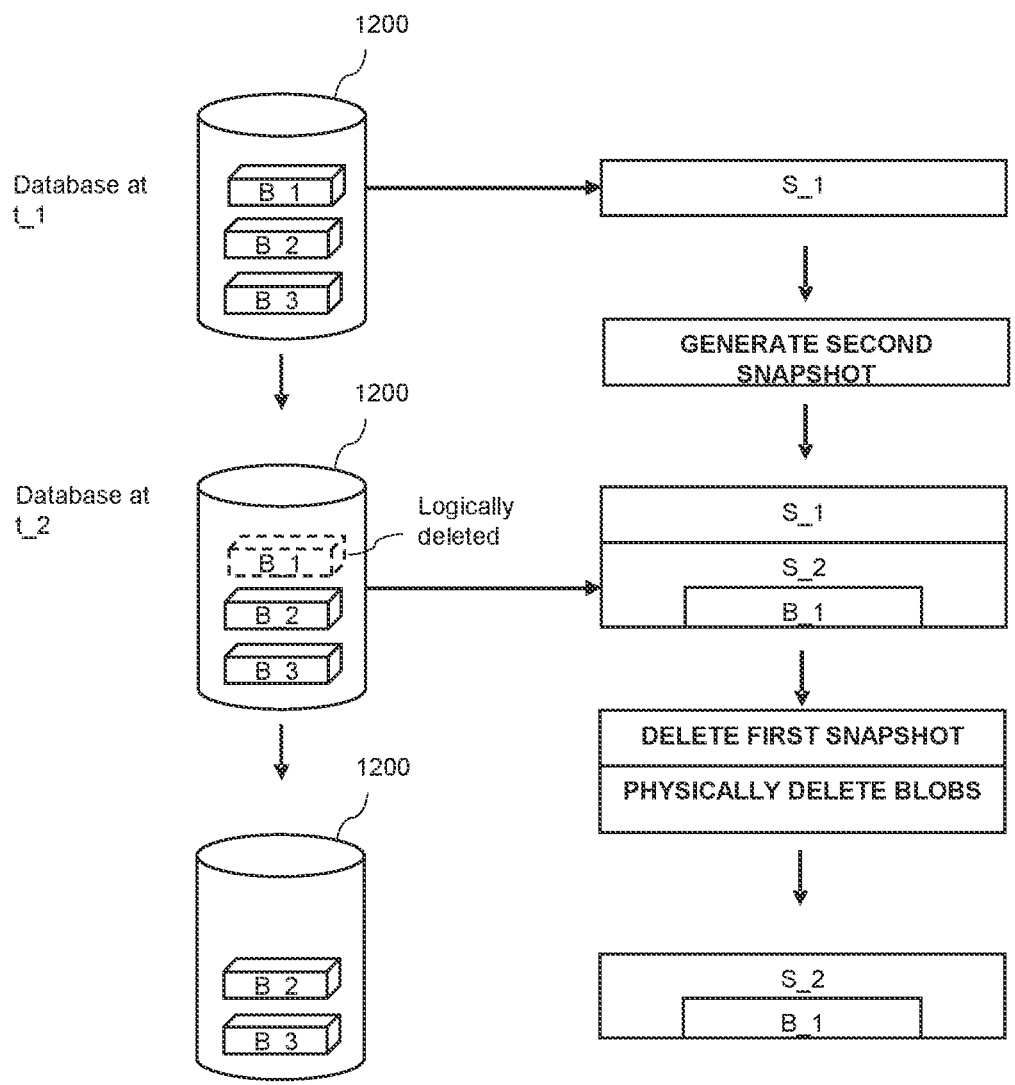
FIG. 12 shows schematically a database and snapshots during a binary large object deletion process according to an example of the method shown in FIG. 11.

FIG. 12 shows schematically the first snapshot S_1 representing a state of the database 1200 at a first time t_1. At time t_1, no binary large objects, B_1, B_2, B_3 have yet been logically deleted from the database 1200. FIG. 12 shows a second snapshot S_2 which represents the database 1200 at a second time t_2 after the first time. At the second time t_2 the binary large object B_1 has been logically deleted from the database and the second snapshot S_2 comprises data identifying the binary large object B_1 that has been deleted before the second time. Subsequently, at some time after t_2, the first snapshot S_1 is deleted. Following the deletion of the first snapshot S_1 the data identifying the binary large object B_1, stored in the second snapshot S_2, is used to delete the binary large object B_1.

As with the embodiments discussed above with regard to FIGS. 5 to 8, database 1200 maintains a plurality of snapshots and periodically generates new snapshots and deletes old snapshots. The method 1100 may comprise deleting the second snapshot S_2 in dependence on a determination that all of the one or more binary large objects that have been logically deleted before the second time t_2 have been physically deleted. This ensures that binary large objects B_1 which can be physically deleted have been physically deleted before deleting the snapshot S_2 which stores the pointers to the binary large objects, B_1. The second snapshot S_2 may be where an indication of the one or more binary large objects B_1 that have been logically deleted before the second time t_2 are stored. If the second snapshot S_2 were to be deleted before ensuring that all of the one or more binary large objects that have been logically deleted before the second time have been physically deleted then binary large objects which should be physically deleted would remain at the database, using up storage space.

The method 1100 may also comprise generating a third snapshot representing a state of the database at the third time, the third time being later than the second time t_2 and the third snapshot comprising data identifying one or more binary large objects that have been logically deleted from the database before the third time. The third time may be before the first snapshot shot is deleted and before the one or more binary large objects that have been logically deleted before the second time t_2 are physically deleted. Alternatively, the third time may be after the first snapshot has been deleted and after the one or more binary large objects that have been logically deleted before the second time t_2 have been physically deleted. The third snapshot may comprise data identifying binary large objects that have been deleted before the second time and before the first time. In this way, each subsequent snapshot may keep a cumulative record of binary large objects that have been logically deleted such that if they are not successfully deleted at the appropriate time they may be located and deleted later by the database system. Deleting a binary large object at an appropriate time comprises deleting the binary large object if an oldest snapshot stored at the database system represents a state of the database at a time after the binary large object has been logically deleted. For example, once a log record corresponding to a transaction which included logically deleting the binary large object is invalidated. Deleting an oldest snapshot and subsequently deleting a binary large object if the binary large object was logically deleted before the next oldest snapshot was generated allows efficient deletion of binary large objects once it is appropriate to delete them. A thread responsible for deleting a snapshot may also perform the deletion of binary large objects that have been logically deleted after a time corresponding to the deleted snapshot and before a time corresponding to the next snapshot. For example, a transaction which includes deleting a snapshot may also include permanently deleting binary large objects that were logically deleted after the deleted snapshot was generated and before the next snapshot was generated. This reduces the number of individual processes or threads running on the database system and allows storage space, used to store binary large objects, to be re-allocated as soon as it is logically correct to do so.

The second snapshot may comprise data identifying one or more binary large objects that have been logically deleted after the first time t_1 and before the second time t_2. Storing data identifying binary large objects that have been logically deleted between two snapshots may be a more efficient way of storing the data indicating the binary large objects that have been logically deleted. This is because, each snapshot may only store data identifying a subset of all the binary large objects that have been logically deleted. The method 1100 may comprise deleting the first snapshot S_1 in dependence on a determination that the second snapshot S_2 has been generated. Deleting the first snapshot S_1 after the second snapshot S_2 has been generated may ensure that before the first snapshot S_1 is deleted, the data identifying the one or more binary large objects B_1 that have been logically deleted before the second time t_1 is stored in the second snapshot S_2 to be used to delete the one or more binary large objects B_1.

Figure 13:
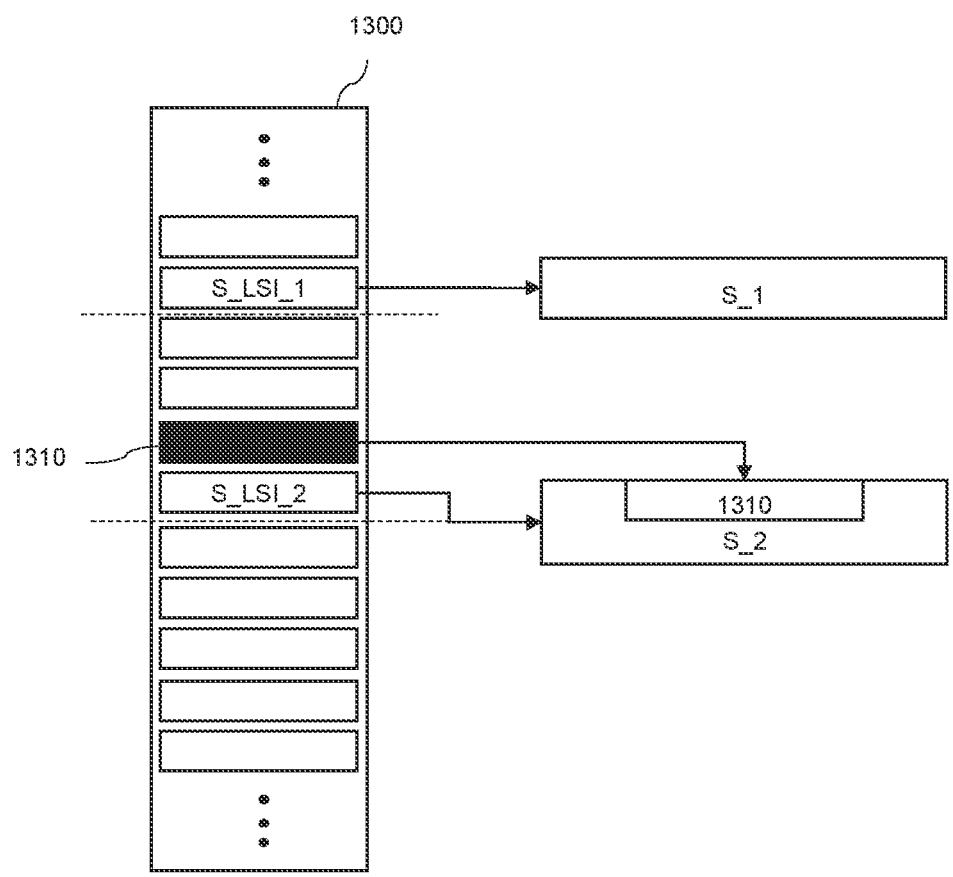
FIG. 13 shows schematically a set of log files and snapshots during a binary large object deletion process according to an example of the method shown in FIG. 11.

FIG. 13 shows schematically a set of log files 1300 comprising a plurality of log records for recording operations performed to data stored at a database, a second snapshot S_2 representing a state of the database at a time corresponding to the snapshot cutoff log sequence indicator S_LSI_2, and a log record 1310 of a first type. The data identifying one or more binary large objects B_1 that have been logically deleted before the second time stored in the second snapshot comprises data corresponding to a log record 1310 of the first type. In some examples, the log record 1310 of the first type may comprise data indicative of one or binary large objects that have been logically deleted before the second time. For example, file names of files comprising the binary large objects, or log sequence indicators corresponding to log records generated when the binary large objects were generated. In other examples the log record 1310 of the first type may comprise an indication of one or more further log records, as will be described later. Generating the second snapshot S_2 may comprise serializing the log record 1310 of the first type to be stored in the second snapshot S_2. Alternatively, generating the second snapshot S_2 may comprise storing a log sequence indicator corresponding to the log record 1310 of the first type in the snapshot S_2 such that the log record 1310 can be located based on data stored in the second snapshot S_2. The log record 1310 of the first type may not be stored in the set of log files 1300 but may be specifically generated to be serialized into the snapshot S_2.

The log record 1310 of the first type is generated when generating the second snapshot. For example, the log record 1310 of the first type may be generated once generating the snapshot S_2 has begun but before the snapshot cutoff log sequence indicator S_LSI_2 has been selected. In other examples, after selecting a snapshot cutoff log sequence indicator S_LSI_2 for determining the time of the snapshot S_2, the log record 1310 of the first type may be generated. The log record 1310 comprises data identifying one or more binary large objects that have been logically deleted before the selected snapshot cutoff log sequence indicator S_LSI_2, in such an example the log record 1310 would appear after S_LSI_2 on FIG. 13. Generating the log record 1310 of the first type may be performed before any further binary large objects are logically deleted after the snapshot cutoff log sequence indicator S_LSI_2 has been selected. Generating the log record 1310 of the first type may be performed as part of generating the snapshot S_2 such as part of the same transaction which corresponds to generating the snapshot S_2.

Figure 14:
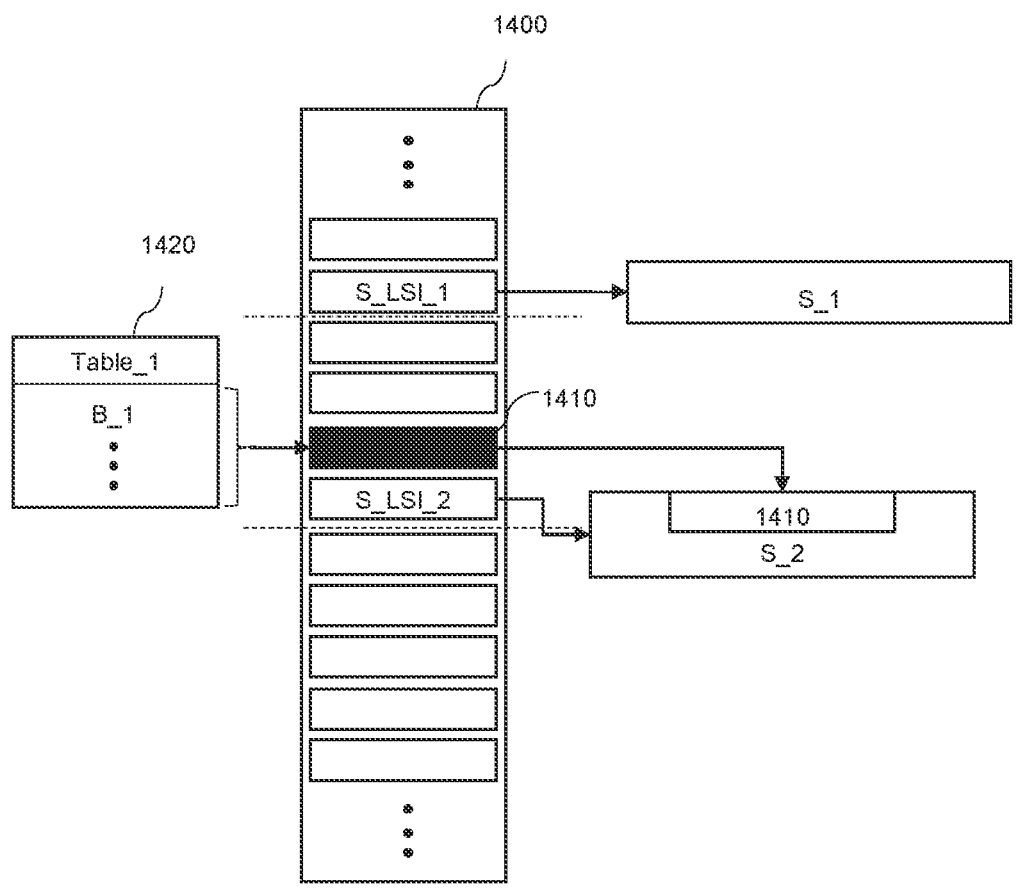
FIG. 14 shows schematically a set of log files and snapshots during a binary large object deletion process according to an example of the method shown in FIG. 11.

FIG. 14 shows schematically a set of log files 1400 comprising a plurality of log records including a log record 1410 of the first type, a first snapshot S_1, a second snapshot S_2 comprising data corresponding to the log record of the first type, and a first table 1420. The log record 1410 of the first type may being generated from one or more entries in the first table 1420 at the database and the one or more entries in the table 1420 being deleted after generating the log record 1410 of the first type. Table 1420 initially comprises an entry identifying the binary large object B_1 that has been logically deleted before the second time and once the log record 1410 of the first type is generated the entry corresponding to B_1 is deleted. Generating the log record 1410 may triggered by other periodic processes in the database system or a dedicated thread may be in control of periodically generating the log records of the first type. The first table 1420 may be periodically updated by adding entries identifying binary large objects that have been deleted since the table was previously updated. Storing data identifying more than one binary large object that has been logically deleted in one log record 1410 provides a more efficient way of storing data in the second snapshot S_2 which indicates the binary large objects that have been logically, and which are to be physically deleting following or during deletion of the first snapshot S_1. Preferably, the one or more entries in the first table 1420 are deleted immediately after generating the log record 1410 of the first type. Deleting the entries in table 1420 immediately after generating the log record 1410 means that during a subsequent snapshot when a further log record of the first type is generated, the further log record of the first type will comprise data corresponding to binary large objects that been deleted after the second snapshot S_2. This also ensures that all entries which are deleted from the table 1420 are included in the log record 1410 of the first type.

Figure 15:
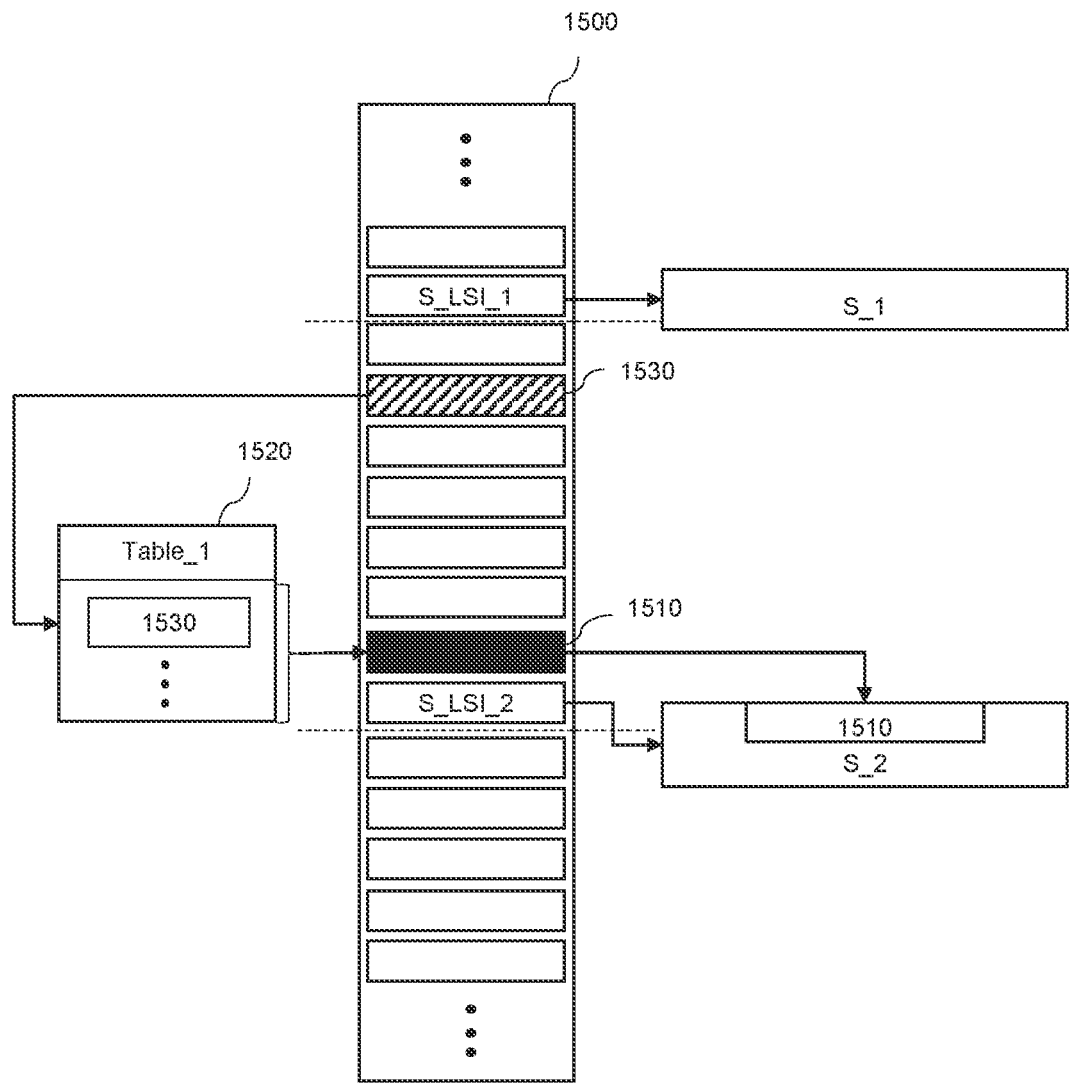
FIG. 15 shows schematically a set of log files and snapshots during a binary large object deletion process according to an example of the method shown in FIG. 11.

In some examples, at least one entry in the first table comprises an indication of a respective log record of a second type comprising data identifying one or more binary large objects that have been deleted before the second time. FIG. 15 shows schematically a set of log files 1500 comprising a plurality of log records, a log record 1510 of the first type, a first snapshot S_1, a second snapshot S_2 comprising data identifying one or more binary large objects that have been deleted before the second time, a first table 1520, and a log record 1530 of the second type. The log record 1530 of the second type comprises data identifying one or more binary large objects that have been logically deleted. The log record 1530 of the second type may be generated in response to a binary large object, for example B_1, being logically deleted from the database. Alternatively, log records of the second type, such as log record 1530, may be generated periodically. Log records of the second type may comprise data identifying binary large objects that have been logically deleted since the previous log record of the second type was generated. By storing data identifying one or more log records of the second type in a log record of the first type, the log record of the first type may comprise a comparatively small amount of data which can be used to locate a large number of binary large objects to be physically deleted. This reduces the size of the second snapshot S_2 while still maintaining the information necessary to locate and physically deleted binary large objects.

When deleting the first snapshot, the part of the set of log files which is invalidated based on the deletion of the first snapshot S_1 is not deleted immediately. The invalidated part of the log file is used in conjunction with the data corresponding to the log record 1510 of the first type stored in the second snapshot S_2 to locate the one or more binary large objects that have been logically deleted before the second time to physically delete the binary large objects. For example, the data corresponding to the log record 1510 of the first type may be used to locate one or more log records of the second type, such as log record 1530, identifying one or more binary large objects that have been logically deleted before the second time. After the binary large objects have been physically deleted based on the one or more log records of the second type 1530 the invalidated log records may then be deleted.

In some examples, the one or more log records of the second type are generated from a second table, and one or more entries in the second table comprise indicators of binary large objects that have been logically deleted before the second time. After generating a log record of the second type, entries in the second table that are used to generate the log record of the second type are deleted from the second table. This process may be performed during a snapshot process occurring on a master database which is linked to a database where the method 1100 is performed, such as where the database is a slave which is configured to replicated from the master database. As a result, the number of threads or processes that need to run on the database system is reduced. This allows grouping and storage of data identifying binary large objects that have been logically deleted and are to be physically deleted, reducing the size of storage space needed in the snapshot S_2. Removing entries in the second table after they are used to generate log records of the second type prevents duplicate recording of indications of binary large objects that have been logically deleted in log records of the second type. It also prevents the second table from growing too large and thereby making the generation of log records of the second type slower. The entries in the second table may comprise data which can be used to locate and identify a binary large object. For example, data indicating a size of the binary large object, a checksum, and/or a log sequence indicator corresponding to a log record recording the generation of the respective binary large object.

Figure 16:
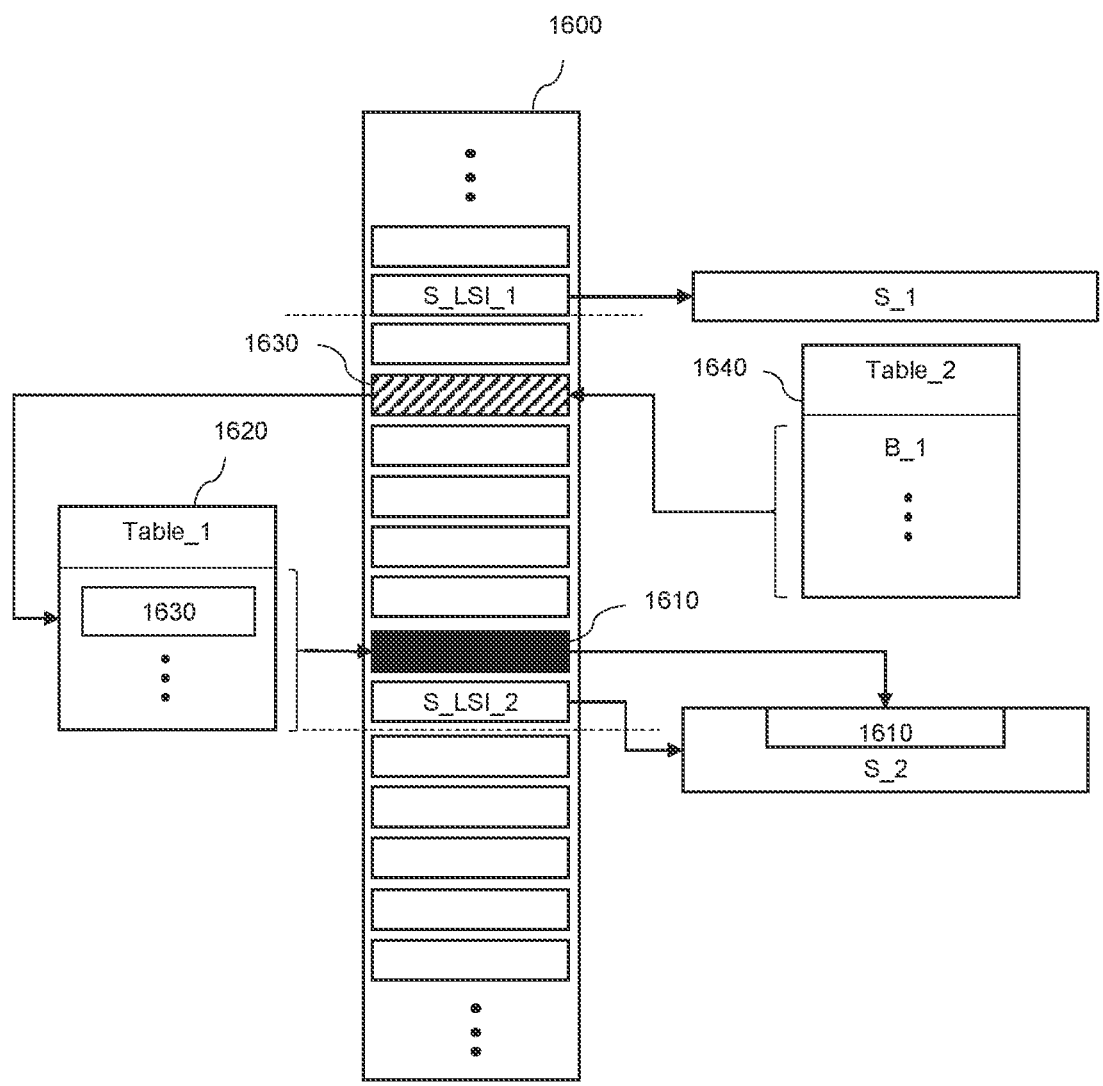
FIG. 16 shows schematically a set of log files and snapshots during a binary large object deletion process according to an example of the method shown in FIG. 11.

FIG. 16 shows schematically a set of log files 1600 comprising a plurality of log records including a log record 1610 of the first type and a log record 1630 of the second type, a first snapshot S_1, a second snapshot S_2, a first table 1620, and a second table 1640. The second table 1640 comprises data identifying binary large objects that have been logically deleted from the database. The second table 1640 may comprise a list of log sequence indicators corresponding to log records for recording operations to generate binary large objects. As discussed above, after storing a binary large object, an association between the binary large object and corresponding log sequence indicator may be maintained and subsequently used to locate the binary large object for deletion.

In some examples, the log record 1630 of the second type is generated using more than one entry of the second table 1640; for example the log record 1630 may comprise data corresponding to a plurality of entries in the second table 1640, such as a plurality of log sequence indicators corresponding to binary large objects that have been logically deleted.

A further one or more entries in the second table 1640 may relate to ongoing operations being performed to binary large objects at the database. For example, one or more transactions which relate to operations on binary large objects and which have not yet been committed. Correspondingly, the method 1100 may involve identifying entries in the second table 1640 relating to binary large objects that have been logically deleted based on a comparison of entries in the second table 1640 with data indicating one or more ongoing operations at the database. An operation may be said to be ongoing, if a transaction which specifies the operation has not yet committed. The second table may be used to store indications of ongoing operations performed to binary large objects and binary large objects that have been logically deleted. Comparing entries in the second table with data indicating one or more ongoing operations at the database may comprise comparing entries in the table with a list or set of active transactions which have not yet been committed. A binary large object is to be treated as being logically deleted if either it corresponds to an entry in the second table 1640 indicating it has been logically deleted or if it corresponds to an entry in the table 1640 which is not associated with an active transaction.

Figure 17:
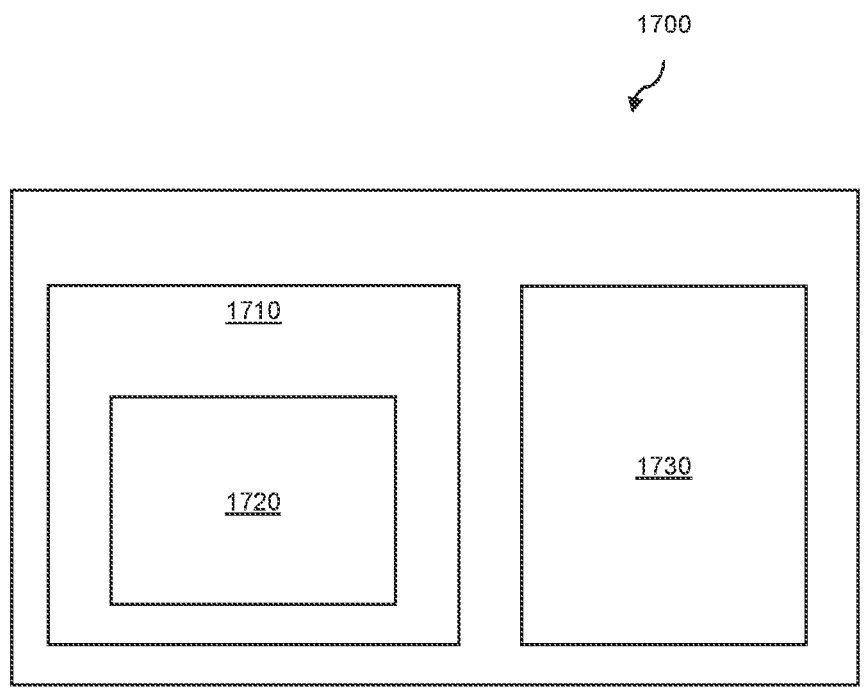
FIG. 17 shows schematically a device, according to an example.

FIG. 17 is a schematic diagram of an exemplary device 1700 configured with software to perform the functionality described herein. The device 1700 has a computer readable medium 1710 and a processor 1730. The computer readable medium 1710 comprises instructions 1720 that, when executed by the processor 1730, cause the processor 1730 to perform one or more of the, previously described, methods, namely method 200; method 500, method 900; and method 1100. The exemplary device 1700 may be a single or may comprise a plurality of devices stored locally with or remotely from one another and configured to communicate via any suitable wired or wireless means. Reference in the specification to "an example" or similar language means that a particular feature, structure, or characteristic described in connection with the example is included in at least that one example, but not necessarily in other examples.

Examples described herein may have particular application to a scale-out architecture database system. A scale-out database system is a database system in which increased demand is met by the addition of new hardware resources. Scale-out architectures can increase capacity in response to workload by provisioning clusters of commodity hardware. The scale-out database system to which the examples herein relate may comprise one or more clusters. Each cluster comprises at least one aggregator node and at least one leaf node. The aggregator nodes handle metadata relating to the database system, route queries, and aggregate results of queries. Leaf nodes store data in the cluster and execute queries which are issued by an aggregator node. Leaf nodes may be partitioned, wherein each partition in a leaf node is a database. To maintain durability in a database system, the partitions in a leaf node may be arranged as a master database and at least one slave database. In such arrangements the slave database(s) is/are configured to replicate the master database.

The number of aggregator nodes and leaf nodes in a cluster determines the storage size and performance of that cluster. Applications which have larger storage demands may have a greater leaf node to aggregator node ratio than a more general application. Applications which have larger connection capabilities requirements may have a higher aggregator node to leaf node ratio than a more general application. Increasing the size of the database system using a scale-out architecture allows an administrator to add new nodes to a cluster and rebalance data stored in the cluster through online operations without having to shut down parts of the database system. Depending on the way in which the database system needs to grow, the database system can be scaled in an appropriate manner. Where the number of queries is increasing, the number of CPUs and RAM which is provisioned can be increased. If the data range is expanding but there is no substantial increase in the processing of data or number of queries, then the storage may be increased. In other situations, such as where the number of objects which are being stored in the database is increasing and hence both increased processing and storage is needed, a distributed scale-out architecture can allow the provision of new machines and therefore more CPUs, RAM, and storage.

Increasing the speed and reliability with which a database can replicate, for example replicating binary large objects, is of particular importance when considering the provisioning of new leaf nodes in a scale-out architecture and during replication between partitions in a node. Further, increasing the reliability of generating snapshots, as in the Snapshot Design section, allows the partitions in each leaf node to quickly generate reliable snapshots. When replicating or reprovisioning a node, or a partition in a node, being able to load a snapshot and replaying any log records having been reserved after the snapshot cutoff log sequence indicator was selected may increase the efficiency of the replicating or reprovisioning. Improving the efficiency and reliability of replication in a distributed database system increases the overall durability of the database system and the ability of the system to maintain the ACID properties.

Handling deletion of binary large objects in a database system such as a distributed scale-out database system allows resources which were provisioned to be released when they are no longer needed. Reducing the storage requirements of leaf nodes, or in some circumstances reducing the number of leaf nodes which are maintained, in a cluster by deleting data which no longer needs to be stored increases the efficiency of the database system and can allow the redeployment of resources to other areas of the database system which require them.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

NUMBERED CLAUSES

The following numbered clauses describe various embodiments of the present disclosure.

1. A computer-implemented method for managing log files for recording operations on data stored in a database, the operations comprising reading or writing data to the database, the method comprising:
   updating a set of log files by writing data indicative of one or more operations that have been performed to data stored in a database to the set of log files, the set of log files having an allocated first portion of storage;
   monitoring the first portion of storage while the set of log files are being updated; and
   dependent on a determination that an available portion of the first portion of storage is below a predetermined size, allocating a second portion of storage for the set of log files while the set of log files are being updated.
2. The computer-implemented method of clause 1, wherein monitoring the first portion of storage while the set of log files are being updated comprises periodically determining a size of the available portion of the first portion of storage.
3. The computer-implemented method of clause 1, wherein monitoring the first portion of storage while the set of log files are being updated comprises determining a size of the available portion of the first portion of storage in response to receiving a request to perform one or more operations to data stored in the database.
4. The computer-implemented method of clause 1, wherein the predetermined size is dependent on a rate of operations being performed to data stored in the database.
5. The computer-implemented method of clause 1, comprising updating a tracking file comprising an indicator of a portion of the set of log files to indicate a most recently updated portion of the set of log files.
6. The computer-implemented method of clause 5, wherein updating the tracking file is performed periodically.
7. The computer-implemented method of clause 5, wherein writing data indicative of one or more operations that have been performed to data stored in the database to the set of log files comprises generating one or more log records in the set of log files, each log record corresponding to a log sequence indicator indicating a relative sequence in the set of log files.
8. The computer-implemented method of clause 7, wherein the indicator of a portion of the set of log files corresponds to a log record in the set of log files.
9. The computer-implemented method of clause 7, wherein updating the indicator of a portion of the set of log files comprises using a log sequence indicator corresponding to a most recently generated log record as at least part of the indicator of a portion of the set of log files.
10. The computer-implemented method of clause 7, wherein the indicator of a portion of the set of log files is updated in response to generating a log record.
11. The computer-implemented method of clause 7, wherein the indicator of a portion of the set of log files is updated in response to generating each log record.
12. The computer-implemented method of clause 8, wherein updating the indicator of a portion of the set of log files comprises selecting a log sequence indicator which is higher than the log sequence indicator corresponding to the most recently generated log record to be used as at least part of the indicator of a portion of the set of log files.
13. The computer-implemented method of clause 1, wherein a size of the second portion of storage is dependent on a rate of operations being performed to data stored in the database.
14. The computer-implemented method of clause 1, wherein a size of the second portion of storage is determined in response to receiving a request to perform one or more operations to data stored in the database.
15. The computer-implemented method of clause 1, wherein allocating the second portion of storage comprises re-allocating a part of the first portion of storage that has been allocated to a subset of the set of log files that have been updated.
16. The computer-implemented method of clause 5, wherein the tracking file is a first tracking file having a first indicator of a portion of the set of log files and the computer-implemented method comprises alternately updating the first tracking file having the first indicator of a portion of the set of log files and updating a second tracking file having a second indicator of a portion of the set of log files.
17. The computer-implemented method of clause 16, wherein the computer implemented method comprises updating a plurality of said first and second tracking files.
18. A non-transitory computer-readable storage medium comprising computer-readable instructions which, when executed by a processor, cause the processor to perform the method of clause 1.
19. A database system comprising:
at least one processor; and
at least one memory including computer program code, the at least one memory and the computer program code being configured to, with the at least one processor, cause the database system to perform the method of clause 1.
20. A computer-implemented method for generating a snapshot representing a state of a database at a given time, the method comprising:
generating a data entry in a database, the data entry being associated with a log record for recording at least one operation corresponding to the data entry, the log record corresponding to a log sequence indicator;
selecting a snapshot cutoff log sequence indicator;
determining a relative order of the log sequence indicator and the snapshot cutoff log sequence indicator; and
generating a snapshot representing a state of the database at a time corresponding to the snapshot cutoff log sequence indicator, wherein the snapshot comprises the data entry in dependence on the determined relative order.
21. The computer-implemented method of clause 20, comprising selecting the log sequence indicator for the log record before generating the data entry.
22. The computer-implemented method of clause 21, wherein subsequent to selecting the snapshot cutoff log sequence indicator, if the log record indicator has an earlier order than the snapshot cutoff log sequence indicator, the method comprises waiting for the data entry corresponding to the log record to be generated in the database before generating the snapshot.
23. The computer-implemented method of clause 21, wherein the data entry comprises the log sequence indicator and determining the relative order comprises comparing the log sequence indicator in the data entry with the snapshot cutoff log sequence indicator.
24. The computer-implemented method of clause 21, wherein the data entry comprises an indicator of the determined relative order of the log sequence indicator and the snapshot cutoff log sequence indicator.
25. The computer-implemented method of clause 24, wherein generating the data entry comprises generating the indicator of the relative order of the log sequence indicator and the snapshot cutoff log sequence indicator based on a global reference variable and selecting a snapshot cutoff log sequence indicator comprises selecting a next available log sequence indicator and immediately thereafter modifying the global reference variable.
26. The computer-implemented method of clause 24, wherein the indicator of the determined relative order of the log sequence indicator and the snapshot cutoff log sequence indicator comprises a first part and a second part, the first part being an indicator of a time at which the data entry was generated, the second part being generated based on a global reference variable.
27. The computer-implemented method of clause 26, wherein generating a snapshot comprises selecting an indicator corresponding to a relative time of the snapshot in comparison to the time at which the data entry was generated and including the data entry in the snapshot is dependent on a determination either that:
the indicator corresponding to the relative time of the snapshot in comparison to the time at which the data entry was generated indicates that the snapshot is to be generated at a later time than the time at which the data entry was generated; or
the second part generated based on the global reference variable corresponds to a value representing the global reference variable prior to the global reference indicator being modified.
28. The computer-implemented method of clause 26, wherein the global reference variable comprises a bit and modifying the global reference variable comprises flipping a value of the bit.
29. A non-transitory computer-readable storage medium comprising computer-readable instructions which, when executed by a processor, cause the processor to perform the method of clause 20.
30. A database system comprising:
at least one processor; and
at least one memory including computer program code, the at least one memory and the computer program code being configured to, with the at least one processor, cause the database system to perform the method of clause 20.

31. A computer-implemented method for replicating a binary large object stored at a first database to a second database, the method comprising:
sending a set of log records corresponding to operations performed to data stored at the first database to the second database;
identifying a log record of the set of log records comprising an indication of a binary large object stored at the first database; and
in response to identifying the log record comprising an indication of the binary large object stored at the first database, sending the binary large object stored at the first database to the second database.

32. The computer-implemented method of clause 31, wherein the set of log records corresponding to operations performed to data stored at the first database are sent to the second database in a sequence and sending the binary large object to the second database comprises inserting the binary large object into the sequence after the log record comprising the indication of the binary large object.

33. The computer-implemented method of clause 32, wherein the binary large object is inserted into the sequence immediately after the log record comprising the indication of the binary large object.

34. The computer-implemented method of clause 31, wherein the identified log record is associated with a log sequence indicator and the binary large object stored at the first database is associated with the log sequence indicator.

35. The computer-implemented method of clause 34, wherein the binary large object is sent to the second database in one or more parts, each part being associated with a respective indicator comprising a first portion associated with the log sequence indicator and a second portion indicating the part of the binary large object.

36. The computer-implemented method of clause 35, comprising:
receiving each of the one or more parts of the binary large object at the second database; and
storing each of the one or more parts at the second database in dependence on the respective indicator.

37. The computer-implemented method of clause 35, comprising storing the binary large object at the second database and maintaining the association between the binary large object and the log sequence indicator.

38. The computer-implemented method of clause 37, wherein the binary large object is stored at the second database in a directory according to at least a part of the log sequence indicator.

39. The computer-implemented method of clause 37, wherein the binary large object is stored at the second database in a multi-level directory, each level of the multi-level directory corresponding to a respective part of the log sequence indicator.

40. The computer-implemented method of clause 31, wherein the identified log record comprises a checksum generated from the binary large object.

41. The computer-implemented method of clause 31, comprising, after the log record has been identified, reserving a portion of storage at the second database for storing the log record.

42. The computer-implemented method of clause 31, comprising, prior to sending the binary large object, generating a file at the second database for storing the binary large object.

43. The computer-implemented method of clause 32, wherein the identified log record comprises data indicating a size of the binary large object and the method comprises reserving space for the one or more parts of the binary large object in the sequence to send the binary large object based on the data indicating the size of the binary large object.

44. The computer-implemented method of clause 43, comprising sending an indication of the one or more parts of the binary large object to the second database, wherein after receiving the one or more parts of the binary large object at the second database, an indication that the one or more parts of the binary large object have been received is generated.

45. A non-transitory computer-readable storage medium comprising computer-readable instructions which, when executed by a processor, cause the processor to perform the method of clause 31.

46. A database system comprising:
at least one processor; and
at least one memory including computer program code, the at least one memory and the computer program code being configured to, with the at least one processor, cause the database system to perform the method of clause 31.

47. A computer-implemented method for physically deleting one or more binary large objects from a database, wherein the database has a plurality of states, a first said state of the database at a first time being represented by a first snapshot, the method comprising;
generating a second snapshot representing a state of the database at a second time, the second time being later than the first time and the second snapshot comprising data identifying one or more binary large objects that have been logically deleted from the database before the second time;
deleting the first snapshot; and
subsequent to deleting the first snapshot, using the data identifying the one or more binary large objects that have been logically deleted before the second time to physically delete the one or more binary large objects from the database.

48. The computer-implemented method of clause 47, comprising deleting the second snapshot in dependence on a determination that all of the one or more binary large objects that have been logically deleted before the second time have been physically deleted.

49. The computer-implemented method of clause 47, comprising generating a third snapshot representing a state of the database at a third time, the third time being later than the second time and the third snapshot comprising data identifying one or more binary large objects that have been logically deleted from the database before the third time.

50. The computer implemented method of clause 47, wherein the second snapshot comprises data identifying one or more binary large objects that have been logically deleted after the first time and before the second time.

51. The computer-implemented method of clause 47, comprising deleting the first snapshot in dependence on a determination that the second snapshot has been generated.

52. The computer-implemented method of clause 47, wherein data identifying one or more binary large objects that have been logically deleted before the second time comprises data corresponding to a log record of a first type.

53. The computer-implemented method of clause 47, wherein the log record of the first type is generated when generating the second snapshot.

54. The computer-implemented method of clause 47, wherein the log record of the first type is generated from one or more entries in a first table at the database and the one or more entries in the table are deleted after generating the log record of the first type.

55. The computer-implemented method of clause 54, wherein the one or more entries in the first table are deleted immediately after generating the log record of the first type.

56. The computer-implemented method of clause 54, wherein at least one entry in the first table comprises an indication of a respective log record of a second type comprising data identifying one or more binary large objects that have been deleted before the second time.

57. The computer-implemented method of clause 56, wherein the one or more log records of the second type are generated periodically.

58. The computer-implemented method of clause 57, wherein the one or more log records of the second type are generated from a second table, one or more entries in the second table comprising indicators of binary large objects that have been logically deleted before the second time, and, after generating a log record of the second type, an entry in the second table used to generate the log record of the second type is deleted from the second table.

59. The computer-implemented method of clause 58, wherein the entry in the second table used to generate the log record of the second type is deleted immediately after the log record of the second type is generated in dependence on the entry being used to generate the log record of the second type.

60. The computer-implemented method of clause 58, wherein the log record of the second type is generated using more than one entry of second table.

61. The computer-implemented method of clause 58, wherein a further one or more entries in the second table relate to ongoing operations being performed to binary large objects at the database and the method comprises identifying entries in the second table relating to binary large objects that have been logically deleted based on a comparison of entries in the second table with data indicating one or more ongoing operations in the database.

62. A non-transitory computer-readable storage medium comprising computer-readable instructions which, when executed by a processor, cause the processor to perform the method of clause 47.

63. A database system comprising:
at least one processor; and
at least one memory including computer program code, the at least one memory and the computer program code being configured to, with the at least one processor, cause the database system to perform the method of clause 47.

What is claimed is:

1. A computer-implemented method for replicating data stored at a first database to a second database, the method comprising:

generating a set of log records recording operations performed to the data stored at the first database;
identifying a log record of the set of log records comprising an indication of a binary large object stored at the first database, the binary large object storing data corresponding to a said operation recorded by the identified log record;
in response to identifying the log record comprising an indication of the binary large object stored at the first database, sending the identified log record and the binary large object stored at the first database to the second database; and
wherein the set of log records corresponding to operations performed to data stored at the first database are sent to the second database in a sequence of log records and sending the binary large object to the second database comprises inserting the binary large object into the sequence of log records after the log record comprising the indication of the binary large object.

2. The computer-implemented method of claim 1, wherein the binary large object is inserted into the sequence immediately after the log record comprising the indication of the binary large object.

3. The computer-implemented method of claim 1, wherein the identified log record is associated with a log sequence indicator and the binary large object stored at the first database is associated with the log sequence indicator.

4. The computer-implemented method of claim 3, wherein the binary large object is sent to the second database in one or more parts, each part being associated with a respective indicator comprising a first portion associated with the log sequence indicator and a second portion indicating the part of the binary large object.

5. The computer-implemented method of claim 4, comprising:
receiving each of the one or more parts of the binary large object at the second database; and
storing each of the one or more parts at the second database in dependence on the respective indicator.

6. The computer-implemented method of claim 4, comprising storing the binary large object at the second database and maintaining the association between the binary large object and the log sequence indicator.

7. The computer-implemented method of claim 6, wherein the binary large object is stored at the second database in a directory according to at least a part of the log sequence indicator.

8. The computer-implemented method of claim 6, wherein the binary large object is stored at the second database in a multi-level directory, each level of the multi-level directory corresponding to a respective part of the log sequence indicator.

9. The computer-implemented method of claim 1, wherein the identified log record comprises a checksum generated from the binary large object.

10. The computer-implemented method of claim 1, comprising, after the log record has been identified, reserving a portion of storage at the second database for storing the log record.

11. The computer-implemented method of claim 1, comprising, prior to sending the binary large object, generating a file at the second database for storing the binary large object.

12. The computer-implemented method of claim 1, wherein the identified log record comprises data indicating a size of the binary large object and the method comprises reserving space for the one or more parts of the binary large object in the sequence to send the binary large object based on the data indicating the size of the binary large object.

13. The computer-implemented method of claim 12, comprising sending an indication of the one or more parts of the binary large object to the second database, wherein after receiving the one or more parts of the binary large object at the second database, an indication that the one or more parts of the binary large object have been received is generated.

14. A non-transitory computer-readable storage medium comprising computer-readable instructions which, when executed by a processor, cause the processor to:
    generate a set of log records to record operations performed to data stored at the first database;
    identify a log record of the set of log records comprising an indication of a binary large object stored at the first database, the binary large object storing data corresponding to a said operation recorded by the identified log record;
    send the identified log record and the binary large object stored at the first database to the second database in response to identifying the log record comprising an indication of the binary large object stored at the first database;
    wherein the set of log records corresponding to operations performed to data stored at the first database are sent to the second database in a sequence of log records and sending the binary large object to the second database comprises inserting the binary large object into the sequence of log records after the log record comprising the indication of the binary large object.

15. A database system comprising:
    at least one processor; and
    at least one memory including computer program code, the at least one memory and the computer program code being configured to, with the at least one processor, cause the database system to:
    generate a set of log records to record operations performed to data stored at the first database;
    identify a log record of the set of log records comprising an indication of a binary large object stored at the first database, the binary large object storing data corresponding to a said operation recorded by the identified log record; and
    send the identified log record and the binary large object stored at the first database to the second database in response to identifying the log record comprising an indication of the binary large object stored at the first database;
    wherein the set of log records corresponding to operations performed to data stored at the first database are sent to the second database in a sequence of log records and sending the binary large object to the second database comprises inserting the binary large object into the sequence of log records after the log record comprising the indication of the binary large object.

* * * * *